United States Patent
Bellorado et al.

(10) Patent No.: US 10,522,177 B1
(45) Date of Patent: Dec. 31, 2019

(54) DISC LOCKED CLOCK-BASED SERVO TIMING

(71) Applicant: Seagate Technology LLC, Cupertino, CA (US)

(72) Inventors: Jason Bellorado, San Jose, CA (US); Marcus Marrow, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/051,234

(22) Filed: Jul. 31, 2018

(51) Int. Cl.
*G11B 5/596* (2006.01)
*G11B 5/55* (2006.01)

(52) U.S. Cl.
CPC ........ *G11B 5/59616* (2013.01); *G11B 5/5526* (2013.01); *G11B 5/553* (2013.01); *G11B 5/5543* (2013.01); *G11B 5/59611* (2013.01); *G11B 5/59633* (2013.01); *G11B 5/59638* (2013.01)

(58) Field of Classification Search
USPC ...... 360/55, 77.07, 77.08, 78.14, 27, 29, 31, 360/39, 51, 53, 75
See application file for complete search history.

(56) References Cited

U.S. PATENT DOCUMENTS

| | | | |
|---|---|---|---|
| 4,984,101 A | 1/1991 | Kanota et al. | |
| 5,321,564 A | 6/1994 | Takahashi | |
| 5,543,978 A | 8/1996 | Park | |
| 5,654,765 A | 8/1997 | Kim | |
| 5,742,532 A | 4/1998 | Duyne et al. | |
| 5,970,093 A | 10/1999 | Lantremange | |
| 6,157,510 A | 12/2000 | Schreck et al. | |
| 6,222,592 B1 | 4/2001 | Patel | |
| 6,320,920 B1 | 11/2001 | Beyke | |
| 6,377,552 B1 | 4/2002 | Moran et al. | |
| 6,505,222 B1 | 1/2003 | Davis et al. | |
| 6,580,676 B1 | 6/2003 | Yanagisawa et al. | |
| 6,633,894 B1 | 10/2003 | Cole | |
| 6,665,308 B1 | 12/2003 | Rakib et al. | |
| 6,687,073 B1 | 2/2004 | Kupferman | |
| 6,697,891 B2 | 2/2004 | Emberty et al. | |
| 6,707,772 B1 | 3/2004 | Marrec et al. | |
| 6,738,205 B1 * | 5/2004 | Moran ............... | G11B 5/59633 360/17 |
| 6,738,215 B2 | 5/2004 | Yatsu | |
| 6,950,258 B2 | 9/2005 | Takaishi | |
| 6,993,291 B2 | 1/2006 | Parssinen et al. | |
| 7,046,701 B2 | 5/2006 | Mohseni et al. | |
| 7,133,233 B1 | 11/2006 | Ray et al. | |
| 7,245,448 B2 | 7/2007 | Urata | |
| 7,298,573 B2 | 11/2007 | Kitamura | |

(Continued)

*Primary Examiner* — Tan X Dinh

(74) *Attorney, Agent, or Firm* — Setter Roche LLP; Christian W. Best

(57) ABSTRACT

Systems and methods are disclosed for timing servo operations within a channel based on a counter for a disc locked clock. In certain embodiments, an apparatus may comprise a servo channel configured to lock a frequency of a servo channel clock to a rotational velocity of a disc data storage medium, and maintain a counter of clock cycles for the servo channel clock. The servo channel may perform operations to read servo data from a servo sector on the disc data storage medium at a first counter value selected relative to a target counter value corresponding to an expected location of a servo timing mark (STM).

30 Claims, 13 Drawing Sheets

(56) References Cited

U.S. PATENT DOCUMENTS

| | | |
|---|---|---|
| 7,324,437 B1 | 1/2008 | Czylwik et al. |
| 7,362,432 B2 | 4/2008 | Roth |
| 7,929,238 B1 * | 4/2011 | Vasquez .............. G11B 5/5547 360/51 |
| 7,940,667 B1 | 5/2011 | Coady et al. |
| 7,948,703 B1 | 5/2011 | Yang |
| 8,139,301 B1 | 3/2012 | Li et al. |
| 8,172,755 B2 | 5/2012 | Song et al. |
| 8,400,726 B1 | 3/2013 | Wu et al. |
| 8,441,751 B1 | 5/2013 | Song et al. |
| 8,456,977 B2 | 6/2013 | Honma |
| 8,479,086 B2 | 7/2013 | Xia et al. |
| 8,514,506 B1 | 8/2013 | Li et al. |
| 8,539,328 B2 | 9/2013 | Jin et al. |
| 8,542,766 B2 | 9/2013 | Chekhovstov et al. |
| 8,713,413 B1 | 4/2014 | Bellorado et al. |
| 8,724,245 B1 * | 5/2014 | Smith .................. G11B 5/5526 360/49 |
| 8,755,139 B1 | 6/2014 | Zou et al. |
| 8,760,794 B1 | 6/2014 | Coker et al. |
| 8,767,341 B1 * | 7/2014 | Coker .................... G11B 20/10 360/77.08 |
| 8,780,477 B1 * | 7/2014 | Guo .................. G11B 20/10222 360/39 |
| 8,837,068 B1 | 9/2014 | Liao et al. |
| 8,861,111 B1 | 10/2014 | Liao et al. |
| 8,861,112 B1 | 10/2014 | Pan et al. |
| 8,953,276 B1 | 2/2015 | Pokharel et al. |
| 9,007,707 B1 | 4/2015 | Lu et al. |
| 9,019,642 B1 | 4/2015 | Xia et al. |
| 9,025,269 B1 * | 5/2015 | Wong .................. G11B 5/59616 360/51 |
| 9,064,537 B1 | 6/2015 | Nie et al. |
| 9,082,418 B2 | 7/2015 | Ong et al. |
| 9,093,115 B1 | 7/2015 | Fung et al. |
| 9,099,132 B1 | 8/2015 | Grundvig et al. |
| 9,129,650 B2 | 9/2015 | Mathew et al. |
| 9,147,416 B2 | 9/2015 | Grundvig et al. |
| 9,196,298 B1 | 11/2015 | Zhang et al. |
| 9,245,579 B2 | 1/2016 | Song et al. |
| 9,245,580 B1 | 1/2016 | Lu et al. |
| 9,257,135 B2 | 2/2016 | Ong et al. |
| 9,257,145 B1 | 2/2016 | Soderbloom et al. |
| 9,286,915 B1 | 3/2016 | Dziak et al. |
| 9,311,937 B2 | 4/2016 | Zou et al. |
| 9,401,161 B1 | 7/2016 | Jury et al. |
| 9,424,878 B1 | 8/2016 | Dziak et al. |
| 9,431,052 B2 | 8/2016 | Oberg et al. |
| 9,508,369 B2 | 11/2016 | Chu et al. |
| 9,542,972 B1 | 1/2017 | Nayak et al. |
| 9,564,157 B1 | 2/2017 | Trantham |
| 9,590,803 B2 | 3/2017 | Derras et al. |
| 9,672,850 B2 | 6/2017 | Grundvig et al. |
| 9,728,221 B2 | 8/2017 | Oberg et al. |
| 9,819,456 B1 | 11/2017 | Bellorado et al. |
| 9,947,362 B1 | 4/2018 | Venkataramani et al. |
| 10,177,771 B1 | 1/2019 | Bellorado et al. |
| 10,276,197 B2 | 4/2019 | Bellorado et al. |
| 10,297,281 B1 | 5/2019 | Bellorado et al. |
| 2002/0181439 A1 | 12/2002 | Orihashi et al. |
| 2003/0198165 A1 | 10/2003 | Mouri et al. |
| 2004/0228397 A1 | 11/2004 | Bach |
| 2005/0117243 A1 | 6/2005 | Serizawa |
| 2007/0139805 A1 * | 6/2007 | Mead ....................... G11B 5/09 360/51 |
| 2007/0139806 A1 * | 6/2007 | Southerland ....... G11B 5/59616 360/51 |
| 2007/0177292 A1 | 8/2007 | Bui et al. |
| 2008/0158711 A1 * | 7/2008 | Bliss ...................... G11B 5/596 360/70 |
| 2008/0175309 A1 | 7/2008 | Fimoff et al. |
| 2009/0141386 A1 | 6/2009 | Miura |
| 2009/0323214 A1 * | 12/2009 | Grundvig ......... G11B 20/10222 360/53 |
| 2010/0290153 A1 | 11/2010 | Hampshire |
| 2011/0002375 A1 | 1/2011 | Honma |
| 2011/0090773 A1 | 4/2011 | Yu et al. |
| 2011/0176400 A1 | 7/2011 | Gerasimov |
| 2012/0105994 A1 | 5/2012 | Bellorado et al. |
| 2012/0155577 A1 | 6/2012 | Shukla et al. |
| 2013/0076433 A1 | 3/2013 | Fratti |
| 2015/0003221 A1 | 1/2015 | Sankaranarayanan et al. |
| 2015/0279398 A1 * | 10/2015 | Fan .................... G11B 5/59644 360/49 |
| 2016/0112218 A1 | 4/2016 | Abe |
| 2017/0249206 A1 | 8/2017 | Jeong et al. |
| 2018/0062623 A1 | 3/2018 | Pagnanelli |
| 2018/0366149 A1 * | 12/2018 | Bellorado .............. H03K 5/135 |

* cited by examiner

DISC LOCKED CLOCK-BASED SERVO TIMING

SUMMARY

In certain embodiments, an apparatus may comprise a servo channel configured to lock a frequency of a servo channel clock to a rotational velocity of a disc data storage medium, and maintain a counter of clock cycles for the servo channel clock. The servo channel may perform operations to read servo data from a servo sector on the disc data storage medium at a first counter value selected relative to a target counter value corresponding to an expected location of a servo timing mark (STM).

In certain embodiments, a method may comprise locking, at a servo channel, a frequency of a servo channel clock to a rotational velocity of a disc data storage medium, maintaining a counter at the servo channel of clock cycles for the servo channel clock, and performing, at the servo channel, operations to read servo data from a servo sector on the disc data storage medium at a first counter value selected relative to a target counter value corresponding to an expected location of a servo timing mark (STM).

In certain embodiments, an apparatus may comprise a data storage device including a disc data storage medium and a channel circuit. The channel circuit may be configured to lock a frequency of a channel clock to a rotational velocity of the disc data storage medium, maintain a counter of clock cycles for the channel clock, and perform operations to read servo data from a servo sector on the disc data storage medium at a first counter value selected relative to a target counter value corresponding to an expected location of a servo timing mark (STM).

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
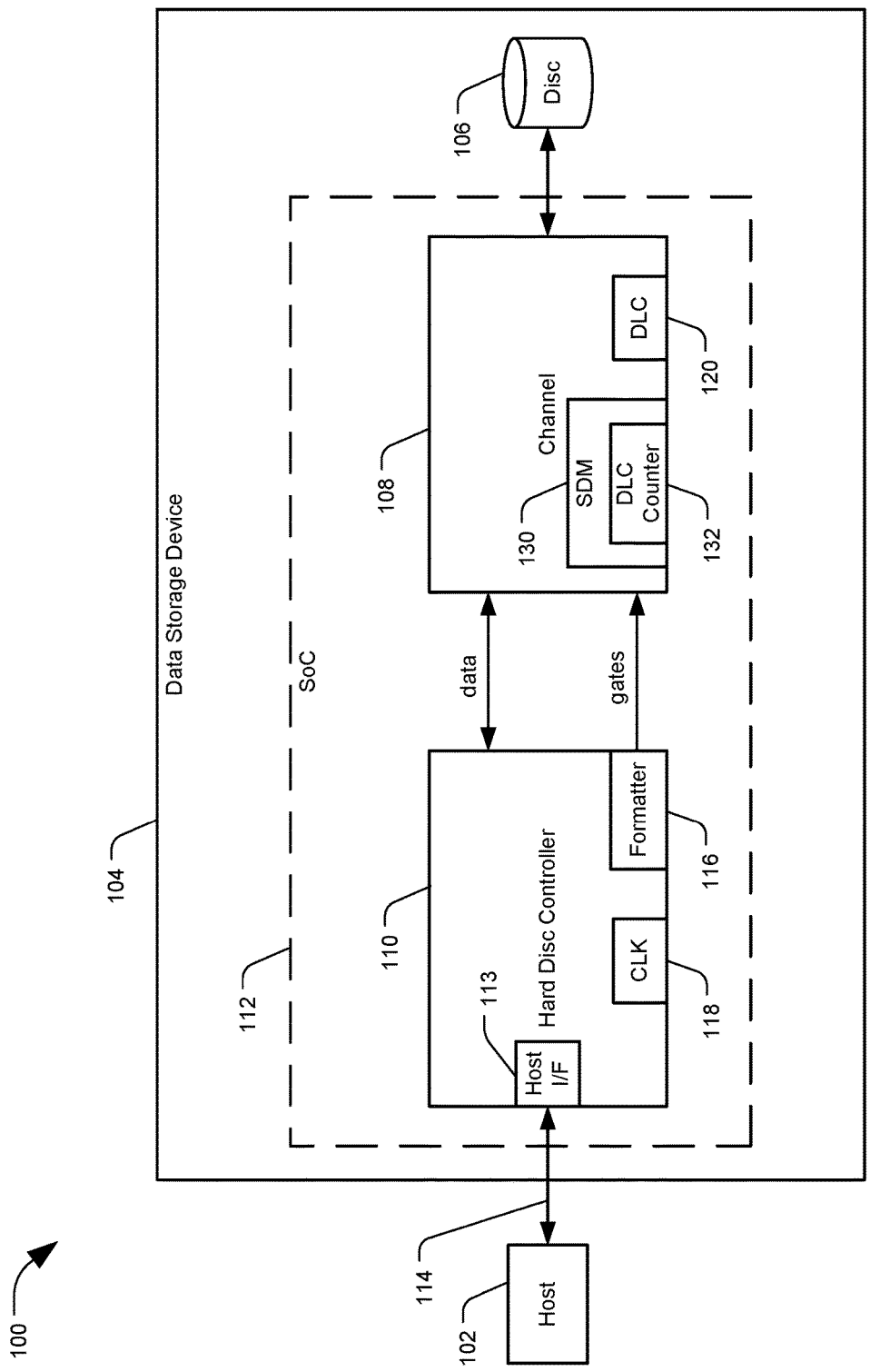
FIG. 1 is a diagram of a system configured to perform disc locked clock-based servo timing, in accordance with certain embodiments of the present disclosure.

FIG. 1 is a diagram of a system, generally designated 100, configured to perform disc locked clock-based servo timing, in accordance with certain embodiments of the present disclosure. The system 100 may include a data storage device (DSD) 104, such as a storage drive or any other device which may be used to store or retrieve data, including a hard disc drive (HDD) or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives.

The DSD 104 may include a disc-based memory 106 and a system on a chip (SoC) 110. The memory 106 may comprise one or more non-volatile memory (NVM) data storage mediums, such as magnetic hard disc platters. An SoC 110 may be an integrated circuit that integrates all or multiple components of a computer or electronics system on a single substrate. In the depicted example, the SoC 110 may include a hard disc controller 110 (sometimes referred to simply as the "controller") and a channel 108.

The controller 110 may be one or more processors or circuits configured to perform data access operations, such as reads or writes (also called program operations), to the disc 106. The controller 110 may be referred to as a data storage controller, or as the main central processing unit (CPU) or processor of the DSD 104. The controller 110 may execute firmware (FW) that controls operations of the DSD 104. Data retrieved from the disc 106, or to be stored to the disc 106, may be processed via the controller 110, the channel 108 (e.g. a read/write (R/W) channel), or other elements for encoding or decoding data, error correction, or other processing.

The channel 108 may include one or more integrated circuits configured for processing signals read from the disc 106 or to be recorded to the disc 106 according to read or write (R/W) commands from the controller 110. The channel 108 may include circuitry, registers, and modules configured to perform operations in relation to a signal, and may be included on one or more chips of a device. A channel may be employed at a receiving end of wired or wireless transmissions, or in devices such as hard drives for storing data to and retrieving data from a storage medium. In some storage devices, such as hard disc drives, the channel 108 may include distinct channels or pathways for certain types of operations (although the different channel may share one or more components). For example, the channel 108 may include a write channel for processing digital sequences of bits into an analog signal to record to the disc 106, a read channel for retrieving and processing user data recorded to the disc 106, and a servo channel for reading and processing servo data recorded to servo sectors on the disc 106, which servo data can be used to obtain positioning information used for locating and adjusting a position of transducer heads relative to a surface of a disc platter.

The system 100 may include a host device 102, which may also be referred to as the host system, host computer, or simply 'host'. The host 102 can be any computer or system that sends commands to the DSD 104. The host 102 can be one or more server-class computers, desktop computers, laptop computers, workstations, tablet computers, telephones, music players, set top boxes, a control system of a self-driving vehicle, other electronic devices, or any combination thereof. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing). The host 102 may issue data access requests, such as read or write requests, to the DSD 104. In response, the DSD 104 may perform data access operations on the disc 106 via the controller 110 based on the requests. The DSD 104 may also access the disc 106 independently of host 102 commands, such as for storage or retrieval of system data and other metadata used by the DSD 104.

As described herein, the host 102 can interact with the DSD 104 for the storage and retrieval of data. As shown, the host 102 can communicate directly with SoC 112 by sending requests (and data, in the case of requests to store) across a host bus 114 to the host interface (Host I/F) 113 located in the controller 110. The controller 110 may respond to the host request by positioning a transducer head (e.g a read head or a write head) over the correct location on the disk 106 and signaling to the channel 108 to carry-out the requested operation. In the case of writes, the controller 110 sends the data to the channel 108 to encode (such that it may be recovered later without error) for generation of the write waveform to apply to the write-head. The timing of the write operation may be dictated by a sub-block of the controller 110 known as the formatter 116, which can asserts a write-gate signal to notify the channel 108 of the write operation. In a similar fashion, read operations are conveyed to the channel 108 through assertion of a read-gate signal by the formatter 116, during which the channel 108 may process a waveform retrieved from the disc 106 to reconstruct the stored data sequence.

In order to properly issue the gate signals at the correct time, the formatter 116 may need to have knowledge of the location of the read/write heads relative to the surface of the disk 106 such that it may appropriately position, and specify the timing of, all data storage and retrieval requests. To maintain this knowledge, the formatter 116 may rely on the operation of the channel 108 and, in particular, its ability to demodulate information stored in special sectors stored to the disc 106 known as servo sectors. Servo sectors, written periodically around the circumference of the disk 106 for the entirety of its radius, contain positional information which, upon assertion of servo-gate by the formatter 116, can be demodulated by the channel 108. The resulting information can be passed to the controller 110 such that the controller 110 and formatter 116 can perform their requisite functionality.

This distribution of functionality between the controller 110 and the channel 108 is functional, but may be suboptimal with respect to the efficient use of a disc's 106 surface space as explained below. As the size of the disc 106 and the areal density with which data is recorded to the disc may limit the total storage capacity of a DSD 104, improving the efficient use of the disc's 106 surface may improve the functionality of the DSD 104 by increasing storage capacity.

In general, the operation of the formatter 116 may be asynchronous with respect to the operation of the disc 106 and, thus, the formatter 116 may be unable to specify the location of the generated gates with a high degree of accuracy relative to the pattern written to the disc 106. The asynchronicity of the formatter 116 to the disc 106 (and to the channel 108) can arise because the formatter 116 operates on a different clock frequency than the channel 108. Computer systems can include clock signal generators (e.g. electronic oscillators) that control the timing of operations within the computer. More complex computer systems may have multiple different clocks for controlling the timing of different parts of the computer system. A clock domain may refer to the memory or computer elements directly controlled by the signal from a given clock, so that different parts of a computer may be operating on different clock domains. In the provided example, the formatter 116 (and potentially the rest of the controller 110) may operate on signals from a first clock 118, while the channel 108 may operate on the signals from a different clock, referred to here as the servo clock or channel clock, which may be locked in frequency or phase to the disc by the disc-locked clock (DLC) subsystem 120. As used herein, the DLC 120 may refer to a system that outputs clock signals that have been locked to the disc. Passing signals between components in different clock domains may result in timing uncertainties for those signals. In another example, a single clock signal generator may generate a clock signal used by both the channel 108 and the controller 110, but the clock cycles may be modified at the channel 108 via the DLC 120 to match a rotational velocity of the disc, while the clock signals used by the controller 110 may remain unmodified. In effect, the controller 110 and channel 106 may be operating on different clock frequencies despite both receiving the same base clock signals.

Accordingly, the formatter 116, which may operate on a different clock than does the channel 108, may processes the information demodulated by the channel 108; however, formatter 116 can only make estimates of the transducer head's location relative to the disc's 106 surface. This uncertainty can require allocating more of the disc's 106 surface for servo information and gaps between data than is required if the uncertainty was reduced or eliminated. By reducing the uncertainty between the formatter 116 and the channel 108, more disc 106 capacity can be devoted to user data storage capacity, thereby improving the performance of the DSD 104.

In order to address the format efficiencies caused by formatter 116 gate uncertainty without appreciable changes to the current formatter 116 operation, a novel architecture is disclosed. In particular, the proposed architecture takes advantage of the operation of the DLC 120 subsystem of the servo channel, which may be nominally used to maintain consistency between the utilized channel 108 clock frequency and the rotational velocity of the disc 106. In so doing, some of the formatting functions from the formatter 116 may be moved to the channel 108. Specifically, the formatter 116 may still be used to provide coarse timing information about the servo sector location, whereas the fine information may be generated by the channel 108, thereby keeping the fine locational information within a single clock domain and reducing locational uncertainty.

To this end, a servo detection module (SDM) 130 may be provided within the channel 108. The SDM 130 may employ a DLC counter 132 to count clock pulses or "ticks" from the DLC 120. As the DLC 120 can be "locked" to the rotational velocity of the disc 106, and servo sectors may be spaced around the disc's 106 surface at regular, predictable intervals, the clock pulses from the DLC 120 can be counted in order to predict the location of servo sectors. The SDM 130 may have knowledge of a number of DLC clock ticks between desired servo data, and may therefore determine when to read servo data accurately within the channel 108 clock domain, with minimal timing input from the formatter 116. An example embodiment of system 100, including a more detailed diagram of DSD 104, is depicted in FIG. 2.

Figure 2:
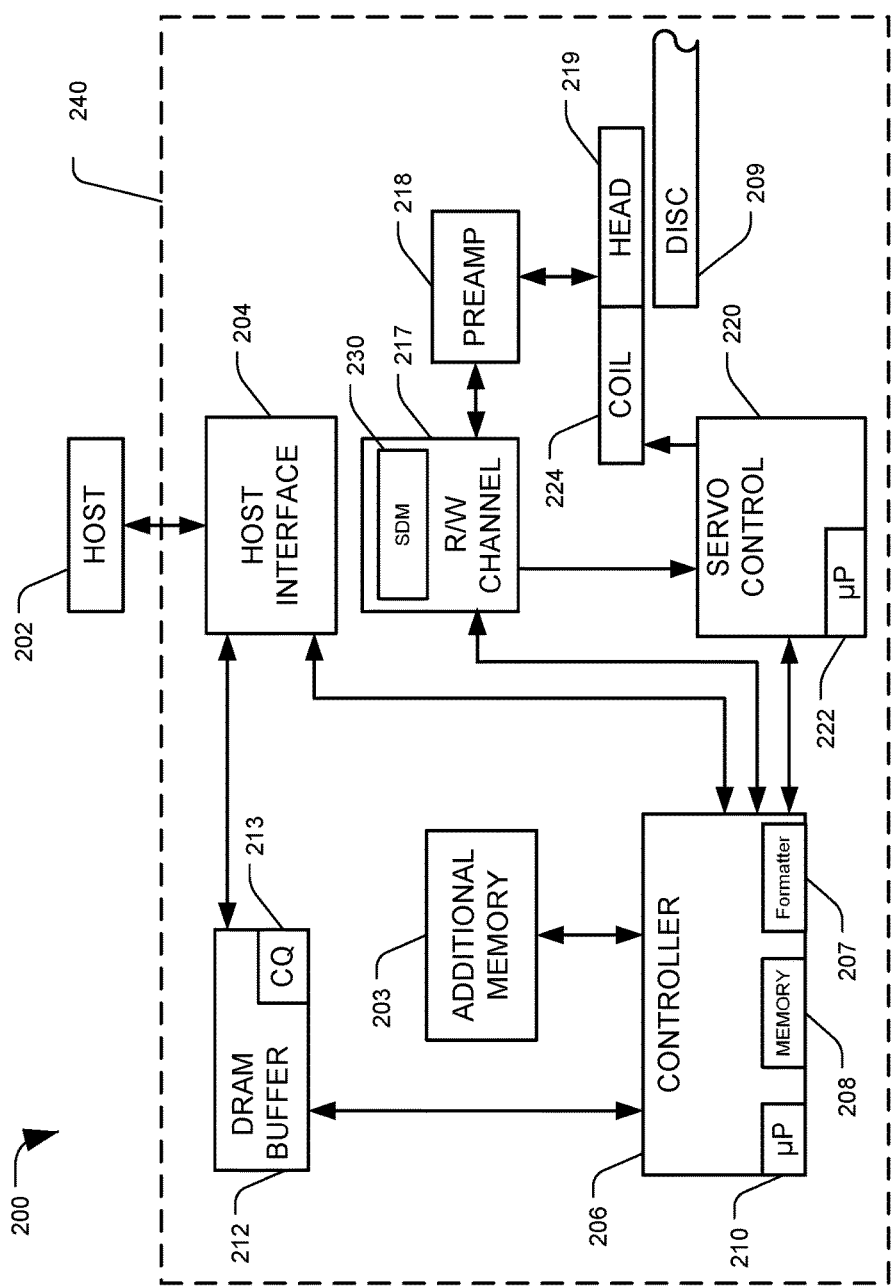
FIG. 2 is a diagram of a system configured to perform disc locked clock-based servo timing, in accordance with certain embodiments of the present disclosure.

FIG. 2 is a diagram of a system, generally designated 200, configured to perform disc locked clock-based servo timing, in accordance with certain embodiments of the present disclosure. Specifically, FIG. 2 provides a functional block diagram of an example data storage device (DSD) 200, which may be an example of the DSD 104 of FIG. 1. The DSD 200 may also be referred to as hard disc drive (HDD) 200, according to some embodiments. The one or more of the circuit components of the DSD 104 may be included on a single integrated circuit (e.g. a system on a chip, SoC), may be distributed among several circuit or hardware components, may be implemented as firmware modules executed by microprocessors, or in other configurations.

The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector that allows the DSD 200 to be physically removed from the host 202. The DSD 200 may have a casing 240 housing the components of the DSD 200.

Commands received from the host 202 via the interface 204 may be stored into a buffer 212. The buffer 212 can be DRAM, SRAM, or other types of memory. The buffer 212 can temporarily store data during read and write operations, and can include a command queue (CQ) 213 where multiple pending host commands can be temporarily stored pending execution. Commands arriving over the interface 204 may automatically be received in the CQ 213 or may be stored there by controller 206, interface 204, or another component.

The DSD 200 can include a programmable controller 206, which can include associated memory 208, processor 210, and formatter 207. The controller 206 may control data access operations, such as reads and writes, to one or more disc memories 209. For example, the controller 206 can assert read gates, write gates, or servo gates via the formatter 207 to control operating modes of a read-write (R/W) channel 217. The DSD 200 may include an additional memory 203 instead of or in addition to disc memory 209. For example, additional memory 203 can be a solid state memory, which can be either volatile memory such as DRAM or SRAM, or non-volatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of non-volatile storage mediums, such as a disc(s) 209 and Flash 203, may be referred to as a hybrid storage device.

The DSD 200 can include the R/W channel 217, which can encode data during write operations and reconstruct data retrieved from a memory, such as disc(s) 209, during read operations. A preamplifier circuit (preamp) 218 can apply write currents to the head(s) 219 and provides pre-amplification of read-back signals. In some embodiments, the preamp 218 and head(s) 219 may be considered part of the R/W channel 217. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213. The DSD 200 may have distinct channels for processing data sectors and servo sectors (e.g. a data channel and a servo channel), although in some embodiments a single channel may be used for both types of signal processing, or certain components may be shared by both channels. For example, the preamp 218 and R/W channel 217 may include components used when processing servo data, and the servo control 220 may also include components of the servo channel and perform servo signal processing.

DSD 200 may include a servo detection module (SDM) 230. The SDM 230 may perform the methods and processes described herein to detect or read a servo sector, which may include counting clock signals from a disc locked clock. The SDM 230 may be a processor, controller, or other circuit, or it may be a set of software instructions that, when executed by a processing device, perform the functions of the SDM 230. In some embodiments, the SDM 230 may be part of or executed by R/W channel 217, part of or executed by servo control circuit 220, included in or performed by other components of the DSD 200, a stand-alone component, or any combination thereof. Additional details on a disc memory 209 and related signal processing are discussed in regard to FIG. 3.

Figure 3:
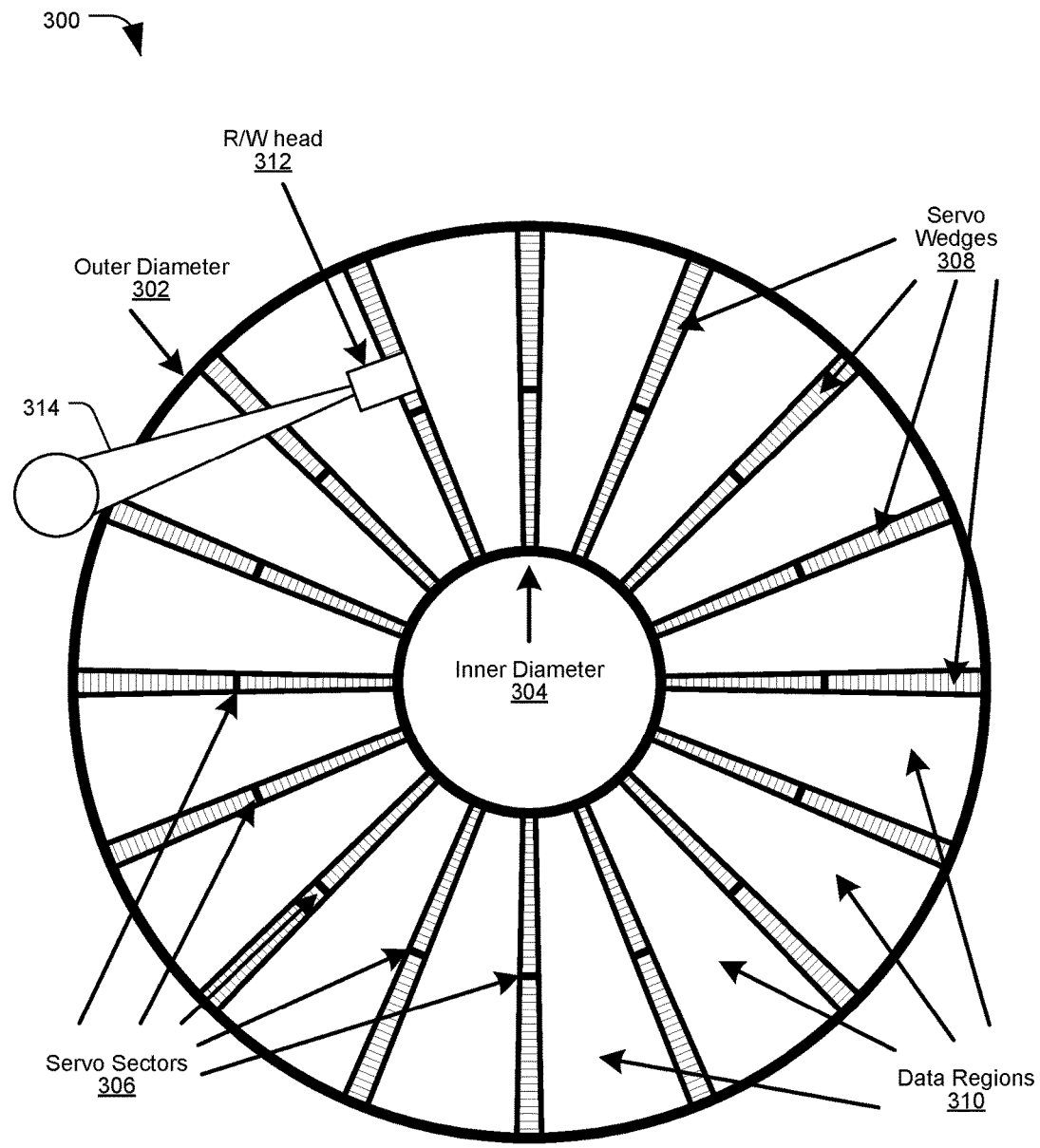
FIG. 3 is a diagram of a system configured to perform disc locked clock-based servo timing, in accordance with certain embodiments of the present disclosure.

FIG. 3 is a diagram of a system configured to perform disc locked clock-based servo timing, in accordance with certain embodiments of the present disclosure. In particular, FIG. 3 depicts servo data recorded to a hard disc 300. The disc 300 may have data recorded to a multitude of concentric circular data tracks arranged from an outer diameter 302 to an inner diameter 304 of the disc 300. The disc 300 may spin about a central spindle located at the center of the disc 300. A read-write (R/W) head 312 may be positioned above the surface of the disc 300 using an adjustable arm 314, and can read or write data to the tracks while the disc 300 spins below the head. Although depicted as a single element, the R/W head 312 may include a slider that flies over the disc 300 surface and includes one or more read head elements and write head elements.

The storage and retrieval of data from a hard disc drive may be made possible by the demodulation of a servo pattern which is written to the surface of each disc 300 during manufacturing. As shown in FIG. 3, the surface of the hard-disc platter 300 may be written with a multitude of servo wedges 308, spanning from the inner diameter 304 to the outer diameter 302, positioned at regular intervals around the disc's circumference. Each servo wedge 308 can include a plurality of servo sectors 306. The servo sectors 306 may define concentrically written tracks, where each track's path may be identified by a multitude of servo sectors 306 written at an (approximately) equal radius and spaced uniformly around the disc 300 (e.g. a track may be composed of all sectors with an equivalent track ID (TID)). An example track may be defined by the servo sectors 306 shaded black in FIG. 3, all at approximately the same radial distance from the center of the disc 300. Data, such as user data and system data which can be written and updated, may be stored to portions of the concentric tracks in the data regions 310 located between each servo wedge 308. While the disc 300 spins below a read head 312, the head 312 may follow a track and detect a recurrent sequence of a servo sector 306 followed by one or more data sectors within the data region 310, followed by another servo sector 306 and so on.

Figure 4:
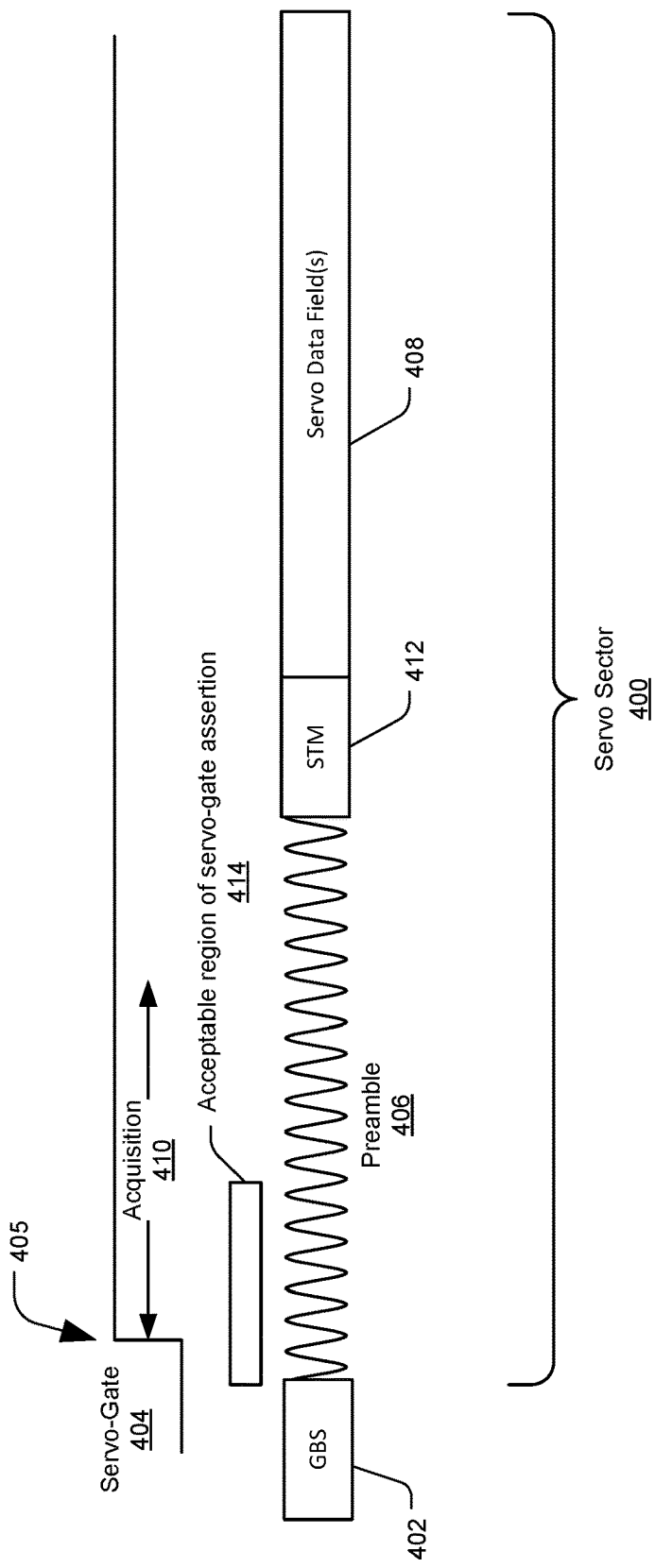
FIG. 4 is a diagram of a system configured to perform disc locked clock-based servo timing, in accordance with certain embodiments of the present disclosure.

These servo wedges 308 may be of critical importance to the reliable storage and retrieval of data. The data contained within each servo sector 306 may specify its physical radial and tangential location on the disc 300. As the read head 312 passes over each servo sector 306, the servo sector's information may be demodulated such that the position of the read head is always known to the channel and controller, and the position of the write-head element(s) 312 may also be inferred. During normal operation, the formatter may have knowledge of the relative position of the next servo wedge 308 to the read head 312 and, thus, may be able to assert a servo gate (a control signal that allows reading of servo patterns and prevents data writes that may overwrite the servo data) at a position relative to the written servo pattern such that the servo sector may be demodulated by the channel. The read-back signal under servo gate may be applied to a system known as the servo channel (e.g. channel 108 of FIG. 1), which demodulates the contained data and provides it to the hard-disc controller. Using this information, the controller may be able to position the read/write head 312 over any location on the disc 300 to carry-out all required disc operations. Furthermore, the measured spacing between servo sectors 306 can be utilized by the DLC subsystem to modulate the frequency of the servo clock of the channel used for write and read operations, such that the DLC frequency remains consistent relative to the rotational velocity of the disc 300. It is this processing of the servo pattern which allows for consistent writes and reliable reads from a hard disc drive. The DLC may be used by the channel to increase the accuracy with which the channel can locate servo sectors 306 on the disc 300, allowing the size of the servo wedges 308 to be reduced and the size of the data regions 310 to be increased. FIG. 4 provides an example depiction of a servo sector from a track of the disc 300.

FIG. 4 is a diagram of a system configured to perform disc locked clock-based servo timing, in accordance with certain embodiments of the present disclosure. In particular, FIG. 4 depicts a portion of an example servo sector 400 from a track of a disc data storage medium.

As explained above, inaccuracies in gate positioning can lead directly to an inefficient use the disc, as will be illustrated in FIG. 4. As shown, the servo sector 400 may begins with a preamble field 406, followed by a servo timing mark (STM) 412, and then one or more servo data fields 408. In some embodiments the servo sector 400 may be preceded with a gap before servo (GBS) 402, which may be an unwritten space that separates the servo sector 400 from user data sectors written to the track.

The preamble field 406 may be a predefined or selected data pattern that can be recognized to indicate the beginning of a servo sector 400. For example, the preamble 406 may be written with an alternating pattern of magnetizations which, when read, generates a sine-wave like read-back signal. The preamble 406 may be used to synchronize timing before the servo sector's 400 data can be demodulated.

The servo-gate 404, indicated by the rising edge 405 of a servo-gate signal, may be asserted over the preamble field 406. Following the assertion of servo-gate 404, the channel may use a fixed number of samples from the preamble 406 to perform the timing synchronization (which may, for example, include timing and gain recovery), in a procedure known as acquisition 410. This process may act to condition the signal, by appropriately adjusting the sampling phase and the signal amplitude to match expected values (e.g. the system may have an expected sampling phase at which the signal from the track is to be sampled, and may adjust the sampling phase at the channel to match the expected sampling phase). Conditioning the signal in this manner may allow for the subsequent detection of the STM pattern 412. The servo data fields 408 that follow the STM 412 may be written with a known relation to the STM pattern, and as such the location of the STM 412 may be used to determine where fields of interest are located in the data fields 408. The data portion 408 of the servo sector 400 may include information identifying a location of the servo sector 400 (and hence the location of the head reading the sector), and other information used to center a head or otherwise notify or influence the servo control system, such as gray code fields, burst patterns, or other information.

As acquisition 410 may be used to perform synchronization based on preamble 406 samples, the servo-gate 404 should not be asserted prior to the start of the preamble field 406 (for example within the GBS 402 where no valid data is located and acquisition may fail), nor any closer to the start of the STM 412 than the number of samples used for acquisition 410. To achieve this in a system where servo detection is initiated solely by the formatter, in which there is timing uncertainty due to the formatter operating in a different clock domain than the channel, additional cycles of preamble 406 can be written beyond those needed for acquisition 410. The servo-gate 404 would then be asserted such that the earliest and latest possible timings relative to the surface of the disc fall within this acceptable window 414. The preamble 406, therefore, would need to be approximately the length needed for acquisition plus the size of this window 414 that accounts for formatter uncertainty in asserting the servo-gate 404. As is the case with any disk space not directly utilized to store user-data, writing this additional preamble 406 used to compensate for gate uncertainty can be an inefficient utilization of the disc. Operation of the DSD may be improved by reducing or eliminating the additional preamble pattern 406 corresponding to the servo-gate assertion window 414 by improving the accuracy with which the acquisition process 410 is initiated relative to the STM 412.

The proposed methodology shows how a written servo preamble field 406 with no (or very few) additional cycles over those used by acquisition 410 may be used. As the proposed method applies the correct operation of the DLC, and because the appropriate written preamble 406 length may be dictated by the maximum length needed for any mode of operation, the proposed methodology also shows how this preamble length may be supported even without an operational DLC (e.g. when the channel clock is not currently "locked" to the rotational velocity of the disc). Additionally, the presented methods are extended to further increase the format efficiency by eliminating, or greatly reducing, all servo fields preceding the first field required for demodulation, save for that dictated by the read-write gap (e.g. the down-track distance between a read element and a write element), which may include the elimination of the GBS field 402. An overview of the proposed methodology for DLC-based servo timing is discussed in regard to FIG. 5.

Figure 5:
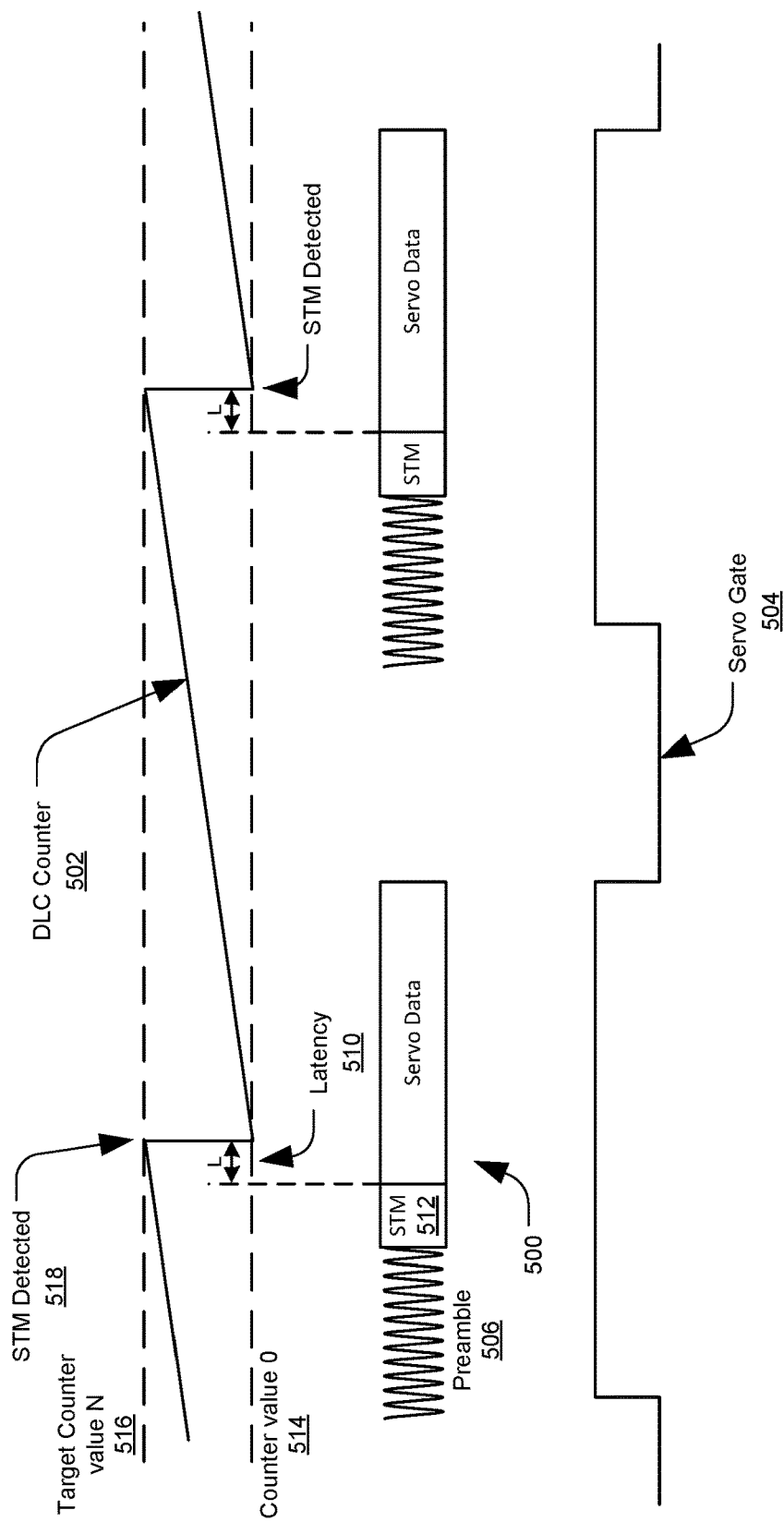
FIG. 5 is a diagram of a system configured to perform disc locked clock-based servo timing, in accordance with certain embodiments of the present disclosure.

FIG. 5 is a diagram of a system configured to perform disc locked clock-based servo timing, in accordance with certain embodiments of the present disclosure. In particular, FIG. 5 depicts how a counter for a disc locked clock (DLC) can be used at a servo channel to accurately locate a servo sector with a reduced preamble.

As previously discussed, the DLC subsystem, operating as part a larger system (e.g. the servo channel) responsible for all processing of servo sectors, may act to modulate the clock utilized by the channel to remain constant with respect to the rotational velocity of the disc. The clock may be modulated based on the disc velocity by using phase interpolators or similar components to adjust a base clock signal with high precision so that, e.g. a specific number of clock cycles elapse between adjacent servo sectors. For example, if the base clock would generate 10,003 clock cycles between adjacent servo sectors, and the desired number is 10,000, the base clock rate could be slightly adjusted to slow the cycles to the desired 10,000 between servo sectors. Once the clock is brought to within an acceptable margin of error of the desired clock rate, the clock may said to be "locked" to the disc.

Modulating the clock rate to remain constant with the disc can be vital to the reliable recovery of data, as eccentricities in the rotational velocity of the disc may change over time and, thus, the effective data-rate at which a data sector was written may be different than the rate at which it is read. Although there are multiple variants on how this may be implemented, the details of the utilized approach are not relevant to this disclosure. The proposed methodology for DLC-based servo timing involves counting the number of clock cycles observed between fixed locations on this disk, and it is expected that the utilized frequency is modulated to drive this count to a desired value. Any approaches to modulating the clock in this can be used in the context of this disclosure.

FIG. 5 depicts a DLC architecture that will be used to illustrate the proposed methods. As depicted, for each clock cycle from the DLC, a DLC counter 502 is incremented, starting at a base value (e.g. counter value 0 514). There may be a known or expected number of clock cycles between each servo sector, which may be represented by target counter value N 516, at which point the next servo sector should be detected and the DLC counter 502 reset. It should be understood that there may be slight variances in the number of clock cycles between sectors due to various irregularities or imperfections in the disc, but once the channel clock is locked to the disc the number of clock cycles between sectors should be within an acceptable margin of error (e.g. with a target count N of 20,000 clock cycles, the margin of error may be less than 0.01%, or 2 clock cycles).

In the provided example, the processing of a servo sector 500 may begin with the assertion of servo-gate 504 and then acquisition, which may synchronize the sampling phase using samples from the preamble field 506, and may be followed by the detection of the (known) servo timing mark (STM) 512 data pattern. As shown, a fixed latency (L) 510 after the STM 512 is sampled (e.g. based on internal sample processing operations) it may be detected, causing the DLC counter 502 to be recorded and reset at position 518 (note that, in some embodiments, additional bits of precision over the integer number of clock cycles may be obtained from the operation of the acquisition procedure, so that, e.g. 20,001.03 clock cycles may be recorded). The DLC operation may ensue by generating an error between the recorded count and a target (desired) count and applying it to a feedback control loop to make adjustments to the utilized clock-rate. Such an approach to the DLC operation acts to drive the clock frequency to a value which minimizes deviations in the number of clock cycles observed between fixed locations on the disc (in this example, these locations are adjacent STMs 512, however, this is merely exemplary). As such, in this embodiment the clock frequency may be locked to the disc; however, in other embodiments the phase of the clock may also be locked to the disk.

When the DLC is locked to the disc in this manner, the DLC is considered to be operational. The DLC may be considered not operational when the DLC is not locked to the disc, for example because the DLC subsystem is disabled so that the clock is not being synchronized to the disc, or because the read head was just moved to a new target track in a new zone which utilizes a different frequency, and a lock has not yet been established for the new target track.

When the DLC is operational, it can be assumed that the computed error (e.g. the difference between the count 502 at STM detection 518 and the target count N 516) is upper bounded by no more than a few clock cycles (e.g. the error magnitude is small). This can be assumed because, for the overall system to operate correctly, the error should be small. In an example hard disc drive, a target count 516 of 20,000 clock cycles would be expected between adjacent STMs, and the difference in the utilized clock frequency and the expected frequency can be no larger than −0.01%, which would give a 2 clock cycle error. In practice, frequency offsets far lower than 0.01% may be more typical and, thus, the corresponding error may also be lower. If the computed error exceeds some permissible threshold, or if the system fails to detect an STM where expected, then the DSD may consider the DLC lock to have been lost, and it may need to be reestablished for the DLC to be considered operational again.

Given this assumption of the error being small, the channel (e.g. via the servo detection module) can utilize the servo-gate 504 generated by the formatter only to initialize the servo channel. The processing of samples, however, may not begin until the position of the read-head, as estimated using the DLC counter 502, reaches a desired location on the disc. This proposal is illustrated in the example embodiment of FIG. 6

Figure 6:
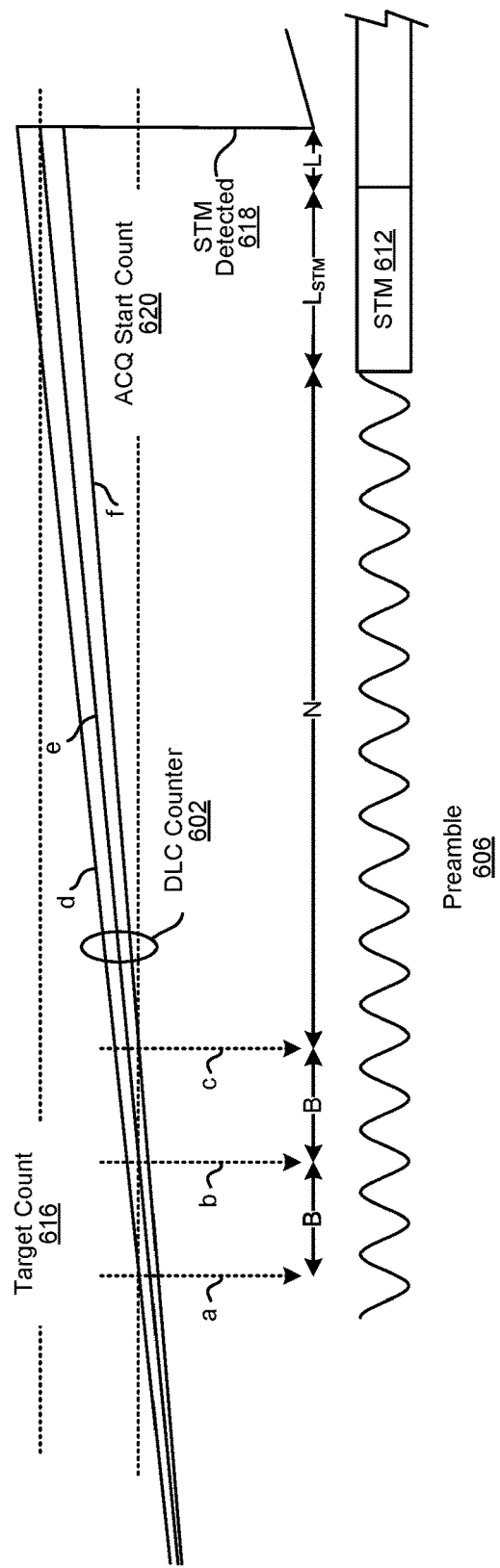
FIG. 6 is a diagram of a system configured to perform disc locked clock-based servo timing, in accordance with certain embodiments of the present disclosure.

FIG. 6 is a diagram of a system configured to perform disc locked clock-based servo timing, in accordance with certain embodiments of the present disclosure. In particular, FIG. 6 depicts how a DLC counter 602 can be used determine when to initiate acquisition or servo sector reading operations.

In FIG. 6, a DLC counter 602 may be counting upwards since the last reset point (e.g. the last time an STM 612 was detected), and it may be expected that the next STM 612 may be detected at 618, approximately when the DLC counter 602 reaches a target count 616. The approximation may be due to the frequency of the DLC potentially differing from the disc rotational speed by a small amount, which may result in the DLC counter value 602 being slightly higher or slightly lower than the target count 616 when the STM is detected at 618. If the DLC is running slightly fast relative to the disc, the DLC counter 602 may be higher than expected, denoted by line d. If the DLC is running slightly slow relative to the disc, the DLC counter 602 may be lower than expected, denoted by line f. If the DLC is running with a minimal error relative to the disc, the DLC counter 602 may match the expected value, denoted by line e.

The point at which the channel begins acquisition can be determined based on the target count 616 at which the next STM is expected to be detected, at 618. The acquisition (ACQ) start count 620 may be the DLC counter value 602 at which the first preamble sample from the ADC (analog to digital converter, a component of the channel that converts analog signal values into digital values) is processed. The ACQ start count 620 may be computed based on the STM detection latency (L), the STM length ($L_{STM}$), the number of samples used for Acquisition (N), and a selected buffer length (B) as, $$\text{ACQ Start Count}=(\text{Target Count}-N-L-L_{STM}-B). \quad (1)$$

As shown by DLC counter 602 marked as e, when the utilized clock rate is such that the STM 612 is detected when the DLC counter 602 reaches the target count 616 (e.g. the zero-error case), the DLC counter 602 may reach the ACQ start count 620 (N+B) clock cycles prior to the start of the written STM 612 (denoted as time b). As such, the acquisition procedure will utilize the N samples ending B samples prior to the start of the STM 612.

Although the buffer period of B samples could be set to zero in the prior example while still supporting successful operation (e.g. the N samples immediately preceding the STM 612 would be used for acquisition), a non-zero buffer length may support situations when the utilized sampling frequency is offset from its nominal value relative to the rotational velocity of the disc (e.g. for DLC counters d and f). As discussed above, FIG. 6 depicts the cases when the sampling frequency is higher (d) and lower (f) than that which produces, resulting in the DLC counter 602 being greater and less than the target count 616 at STM detection 618, respectively. As shown, case d may result in the DLC counter 602 reaching the ACQ start count 620 B cycles earlier than (denoted by a) the intended acquisition start location (time b), which case f may result in the DLC counter 602 reaching the ACQ start count 620 B cycles later than (denoted by c), the intended acquisition start location. Thus, to support these frequency offsets, it is suggested that (N+2B) samples of preamble 606 be written to the disc to ensure that the acquisition procedure only utilizes preamble 606 samples. From the example provided at the start of this section, in which the error metric should be no greater than 2 cycles (B=2), with one sample per cycle, providing a 2B buffer may include providing an additional 4 samples of written preamble field 606 in addition to the N samples used for acquisition. 4 additional samples may be significantly fewer than the number of additional preamble samples provided in a system where the formatter controls acquisition timing based on the assertion of servo-gate alone.

The operation of the formatter may be largely unchanged in the proposed methodology, except that the timing of servo-gate assertion may be less stringent. The only constraint placed on the assertion of servo-gate in this proposition is that it occurs prior to the DLC counter 602 reaching the ACQ start count 620 (an error should be given if this is not the case). Although the DLC counter 602 may be kept internal to the channel (e.g. it may not be available to the formatter) in its current mode of operation, it can be guaranteed that the assertion of servo-gate is no closer than N cycles prior to the start of the written STM 612. As such, the timing of the assertion of servo-gate can be changed to assert B cycles earlier to accommodate the requirement. In the proposed methodology, there may be no restriction placed on how early the servo-gate asserts, as the channel ignores samples prior to the DLC counter 602 reaching the ACQ start count 620 and, thus, servo-gate timing may be advanced even further in time if desired. For example, the servo-gate may be asserted before the preamble 606 begins, such as during the gap before servo or even during a user data sector prior to the servo sector. The servo gate may even be asserted with a read gate or write gate is in effect. Overlapping gates may generate an interrupt to the processor, in some implementations, but the firmware may be configured to ignore such overlapping situations.

Using the proposed methodology, a servo system may operate correctly with a written preamble field 606 of length 2B samples longer the N utilized by acquisition, where B is selected to accommodate the worst-case offset in sampling frequency from its intended value relative to the disc rotation. However, the DLC should be operational, and its generated error should be sufficiently small in magnitude so as allow the use of the chosen value of B. Although these conditions should be true for the majority of the operation of the disc, there may be some instances in which they are not. For example, during a seek operation, the read-head may be moved in the radial direction so as to adjust its position to a new track. Because the slider moves the head in an arc-like trajectory, the generated DLC error can be far greater during or after a seek than its value during normal operation. This may only apply to larger seeks spanning many tracks, as shorter seeks, sometimes called microjogs, may still maintain the error metric within an acceptable threshold. Since larger seeks may introduce large errors, and the written preamble field 606 length can be no shorter than the maximum required for any mode of operation, situations in which the DLC is not operational are discussed below in regard to FIG. 7.

Figure 7:
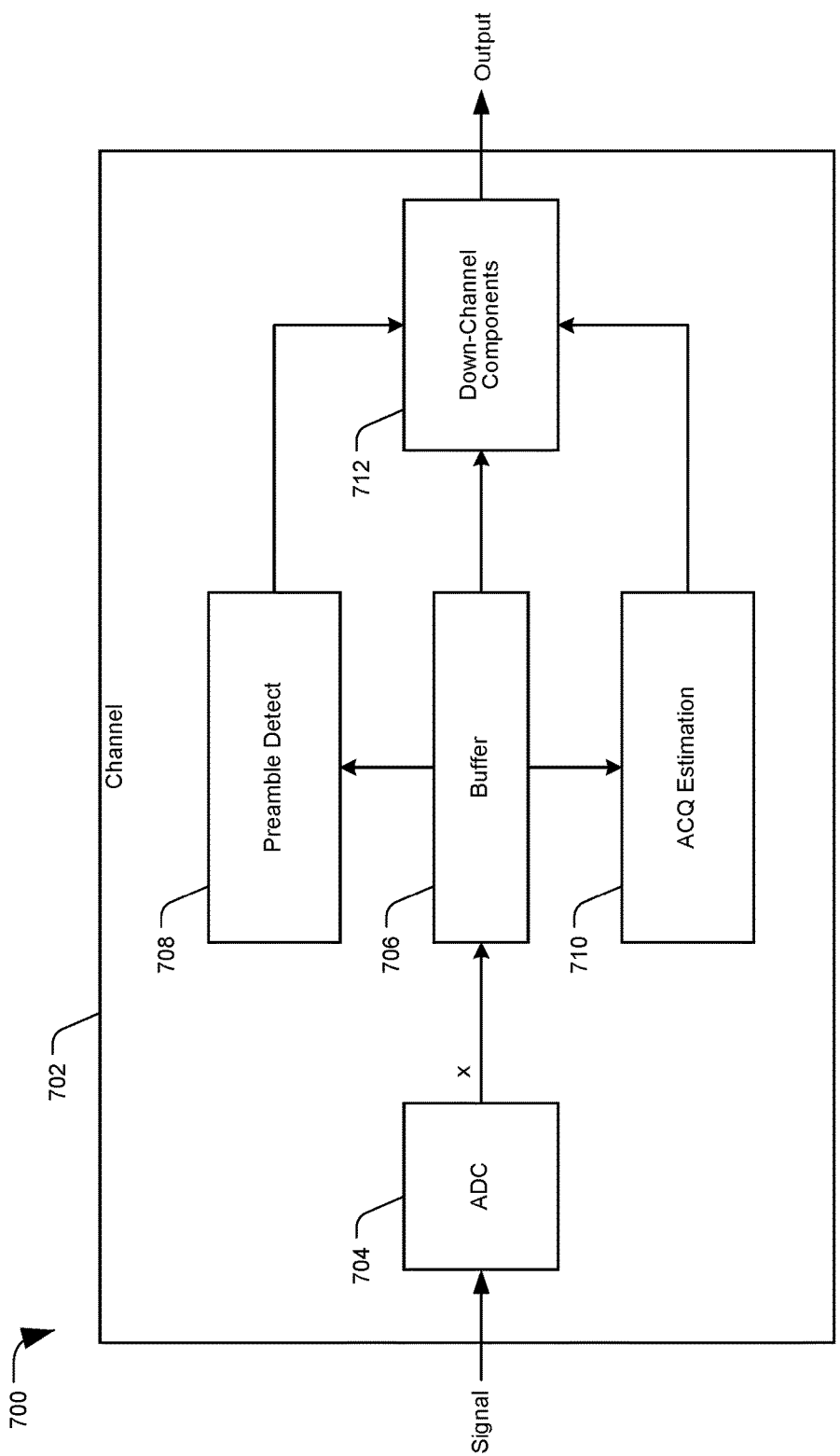
FIG. 7 is a diagram of a system configured to perform disc locked clock-based servo timing, in accordance with certain embodiments of the present disclosure.

FIG. 7 is a diagram of a system, generally designated 700, configured to perform disc locked clock-based servo timing, in accordance with certain embodiments of the present disclosure. Specifically, FIG. 7 provides a functional block diagram of an example channel 702, which may be an example of the channel 108 of FIG. 1.

The system 700 is proposed for use during periods of time the DLC is non-operational, or its operation is believed to generate errors in excess of those allowed for by the selection of the written preamble field length. The channel 702 may receive a signal, such as an analog signal produced by a read head based on reading a disc, and may process the signal to generate an output, such as a decoded bit sequence which may be provided to a controller. The channel 702 may include an analog to digital converter (ADC) 704, which may periodically sample the signal to generate a sequence of digital sample values "x".

The channel 702 may take the ADC 704 samples generated after the assertion of servo-gate and apply them, through a buffer 706, to a preamble detection module 708 and an acquisition (ACQ) estimation module 710. The ACQ estimation module 710 may generate estimates of acquisition parameters based on a set of N samples from the ADC 704. The operation of the ACQ estimation module 710 may be similar to that conducted during standard acquisition, and indeed may include performing the same operations with the same components as used during acquisition. However, since the samples are not yet determined to be that of the preamble field, they cannot yet be used, as samples not from a preamble may produce acquisition values that would prevent proper detection and reading of servo data. As such, the ACQ module 710 may generate estimates for potential application to the down-channel components 712. For example, in some embodiments the ACQ estimation module 710 operation would consist of generating a sampling phase estimate, a gain estimate, an estimate of the DC (direct current) offset present in the signal, other estimates, or any combination thereof, under the assumption that the samples are, indeed, that of preamble. These estimates would, then, be generated and provided to the down-channel components 712 for potential later use.

The preamble detection module 708 may operate in parallel with the ACQ estimation module 710 in that it can generate a metric, using the same set of N samples used to generate the acquisition estimates, to determine the probability that the applied samples are that of the preamble field. Once the preamble detection module 708 has affirmatively detected the preamble field from a selected set of N samples, the channel 702 may directly utilize the output of the ACQ estimation module 710 for those same N samples to conduct acquisition and subsequently demodulate the remainder of the servo sector.

The internal operations of the ACQ estimation module 710 and the preamble detection module are outside the scope of the current disclosure. Any method which, given a set of consecutive ADC samples, generates a metric for those samples to indicate their similarity to those expected from a preamble field may be utilized. One such method that potential method is described in U.S. Pat. No. 9,819,456, entitled "Preamble Detection and Frequency Offset Determination." Potential results of the operation of a preamble detection module 708 is shown in regard to FIG. 8.

Figure 8:
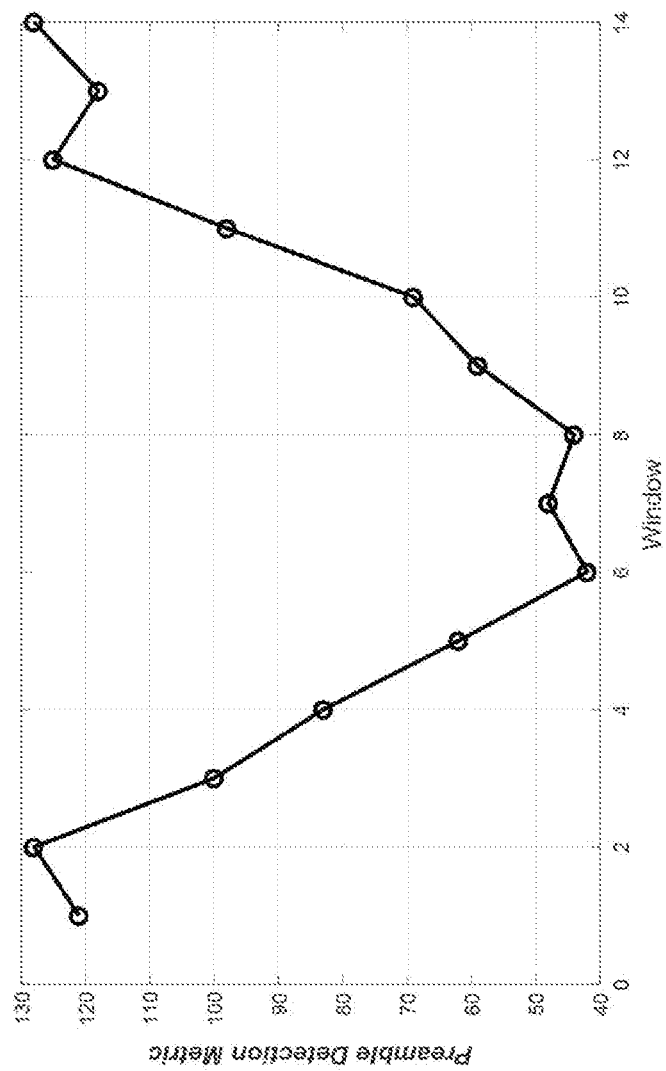
FIG. 8 is a graph of results from a system configured to perform disc locked clock-based servo timing, in accordance with certain embodiments of the present disclosure.

FIG. 8 is a graph, generally designated 800, of results from a system configured to perform disc locked clock-based servo timing, in accordance with certain embodiments of the present disclosure. In particular, FIG. 8 depicts a graph of example metrics generated by the preamble detection module 708 of FIG. 7 for a sliding window of N applied samples. In the depicted example, in each window four new samples are shifted into the window and the four oldest samples are shifted out. For example, a window may include 16 samples, with a first window including samples 1 through 16, which then shifted to a second window including samples 5 through 20, and so on. The generated preamble detection metric may provide an indication of how likely the samples from the window are to correspond to samples from a preamble field of a servo sector.

In some embodiments the preamble detection module 708 may compare sets of N samples against expected values that would be produced by a preamble field to generate a similarity metric. The metric generated by the preamble detection module 708 may be directly compared to a threshold to determine the presence of a preamble. As shown in FIG. 8, setting a threshold of below 70 would select Window 5 as a first window to meet the preamble detection criteria, whereas setting a threshold of below 60 would select Window 6 as the detected preamble. As shown, because each window of samples may be similar to surrounding windows (if only a few samples are shifted in between adjacent windows) such an approach may have difficulty locating the exact window of preamble. As a result, some embodiments select the window with minimum generated metric (e.g. Window 6), and other embodiments select the window farthest away from the excessively large metrics (e.g. Windows 5-10 all have metrics less than 80, so Windows 7 and 8 are possible selections). The latter of these possibilities can work particularly well when a window of M<N samples are used for this procedure (where M may be a number of samples in a window and N may be a number of samples used for acquisition in a preamble), since it may be known, a-priori, that multiple consecutive Windows will contain only preamble patterns.

To facilitate different approaches, the number of samples in a preamble detection window may, in some embodiments, be different than a number of samples used by the ACQ estimation module 710 to generate acquisition estimates. For example, the preamble detection module 708 may evaluate shifting Windows of M samples to detect preamble, while the ACQ estimation module 710 may evaluate shifting windows of N samples to generate acquisition estimates. Further, a determination on which Window(s) of samples corresponds to preamble may be delayed until multiple windows can be evaluated (e.g., Windows 1 through 14 of FIG. 8 may be evaluated to determine that Windows 7 or 8 are the best candidates). Multiple sets of acquisition estimates may therefore be generated and stored, for example to a buffer memory 706 or to another memory, so that the acquisition estimates corresponding to the Window(s) determined to correspond to preamble can be used to set channel parameters.

It can therefore be seen that methods exist which, when DLC is not operational or the drive operation is in such a state that small DLC errors cannot be assumed, may be used with written servo preamble fields that are only equal to, or marginally longer than, what is utilized by acquisition (e.g. N+2B samples). The methods that rely on the detection of servo preamble without the DLC may be less robust than what was presented for an operational DLC, and as such, such techniques may be less desirable for normal operation.

In addition to reducing a size of the preamble pattern, DLC-based servo timing may also be used to reduce or eliminate the gap before servo, or even to eliminate the need for some preamble fields. Techniques for further improving format efficiency are detailed in the following figures.

Figure 9:
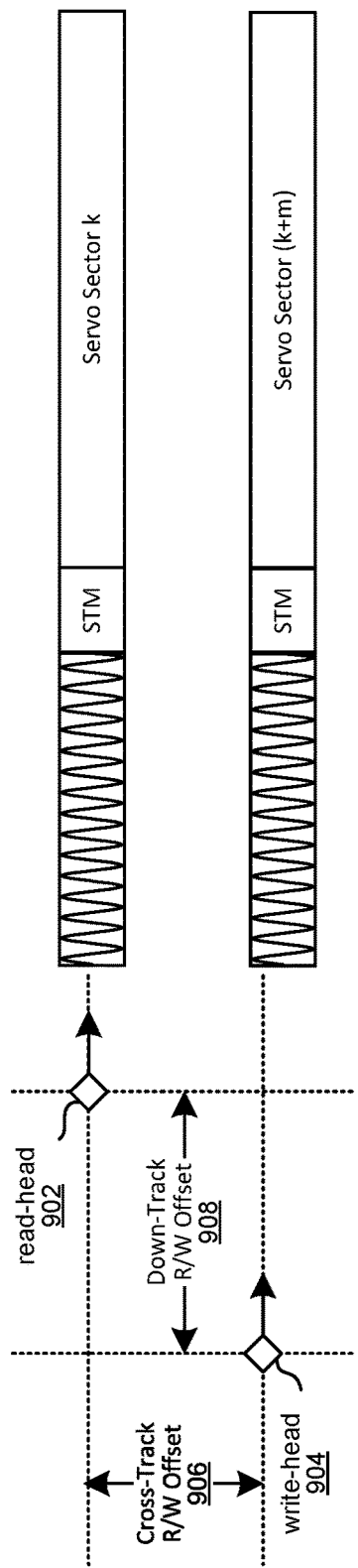
FIG. 9 is a diagram of a system configured to perform disc locked clock-based servo timing, in accordance with certain embodiments of the present disclosure.

FIG. 9 is a diagram of a system configured to perform disc locked clock-based servo timing, in accordance with certain embodiments of the present disclosure. In particular, FIG. 9 depicts a portion of several tracks of a storage medium, and a read-head 902 and a write-head 904 traversing the tracks.

The methodology proposed herein for automated gate placement using the DLC counter is extended here to achieve additional format efficiency gains. FIG. 9 shows that, although the read-head 902 and the write-head 904 may be fabricated on the same piece of silicon (e.g. they may share a single slider and be positioned using a single moving arm), they are physically separated by a distance. In general, this separation may be divided into its cross-track reader/ writer (R/W) offset 906 (that which is perpendicular to the direction of head-movement relative to the media) and down-track R/W offset 908 (that which is parallel to the direction of head-movement relative to the media). These offsets may result in the read-head 902 being situated over a different servo track than the write-head 904. In this case, the read-head 902 may be traversing a track "k" while the write-head 904 may be traversing a track "k+m". Note that while the offset values may change continuously as the head is moved across the stroke of the disc, the write-head 904 may always trail the read-head 902 (e.g. the read-head 902 may be farther down-track than the write-head 904). A write operation in light of the R/W offsets is described in regard to FIG. 10.

Figure 10:
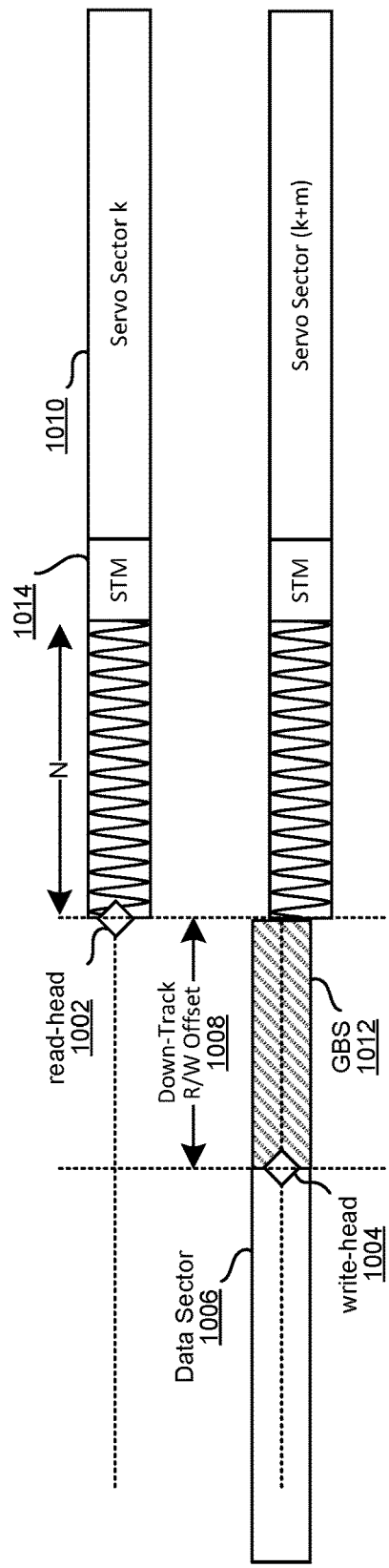
FIG. 10 is a diagram of a system configured to perform disc locked clock-based servo timing, in accordance with certain embodiments of the present disclosure.

FIG. 10 is a diagram of a system configured to perform disc locked clock-based servo timing, in accordance with certain embodiments of the present disclosure. As shown, data tracks, on which user data may be stored to data sectors 1006, and servo tracks, consisting of servo sectors having an approximately equal radial location on the disc, are not necessarily aligned in the cross-track direction. FIG. 10 depicts a data sector 1006 write operation as the read-head 1002 approaches the next servo sector 1010. This write operation may be forced to complete at this time to avoid the write signal from interfering with the read operation of the next servo sector 1010, since write-head 1004 and read-head 1002 may share a common pre-amplifier. Although continuation of the write process is possible, the continual toggling of the write data signal through the pre-amplifier can interfere with the read-back signal, making demodulation of the servo sector 1010 difficult, if not impossible. As a result, the gap before servo (GBS) 1012 exists between the written data sectors 1006 and the start of each servo sector. The GBS 1012 may have a length equal to the down-track R/W offset 1008.

In order to continue the write operation beyond this location, the read-operation may be suspended until the write has completed. However, suspending the read operation may mean the read-head 1002 may not have the opportunity to read N preamble samples to perform acquisition, and subsequently may not be able to read and identify the STM 1014 used to locate and identify the data fields of the servo sector 1010.

To overcome this situation, once again the DLC counter may be used to determine the position of the read-head without performing acquisition and locating the STM 1014. However, in this example it is assumed that the accuracy of the read frequency currently utilized by the channel is such that errors produced between the DLC counter and the target count (assuming additional bits of precision over 1T clock cycles are utilized, with 1T here representing a single clock cycle and a single signal sample) is small enough in magnitude that the acquisition procedure may be omitted without significantly compromising the servo sector 1010 demodulation. For example, it is assumed that the phase of the recorded signal has not significantly drifted away from that estimated in the preceding servo sector and, as such, the previous acquisition estimates can be utilized for demodulating the current servo sector 1010. In this manner, acquisition may be performed on every other servo sector, on every third servo sector, or at other increments based on the reliability or consistency of the channel and recorded signal.

Furthermore, the DLC counter accuracy can be exploited to avoid conducting an actual STM 1014 detection. Instead, the channel may declare the STM 1014 detected when the DLC counter reaches its target count, even though no actual STM 1014 detection was performed. The potential gains realized from this technique are shown in further detail in FIG. 11.

Figure 11:
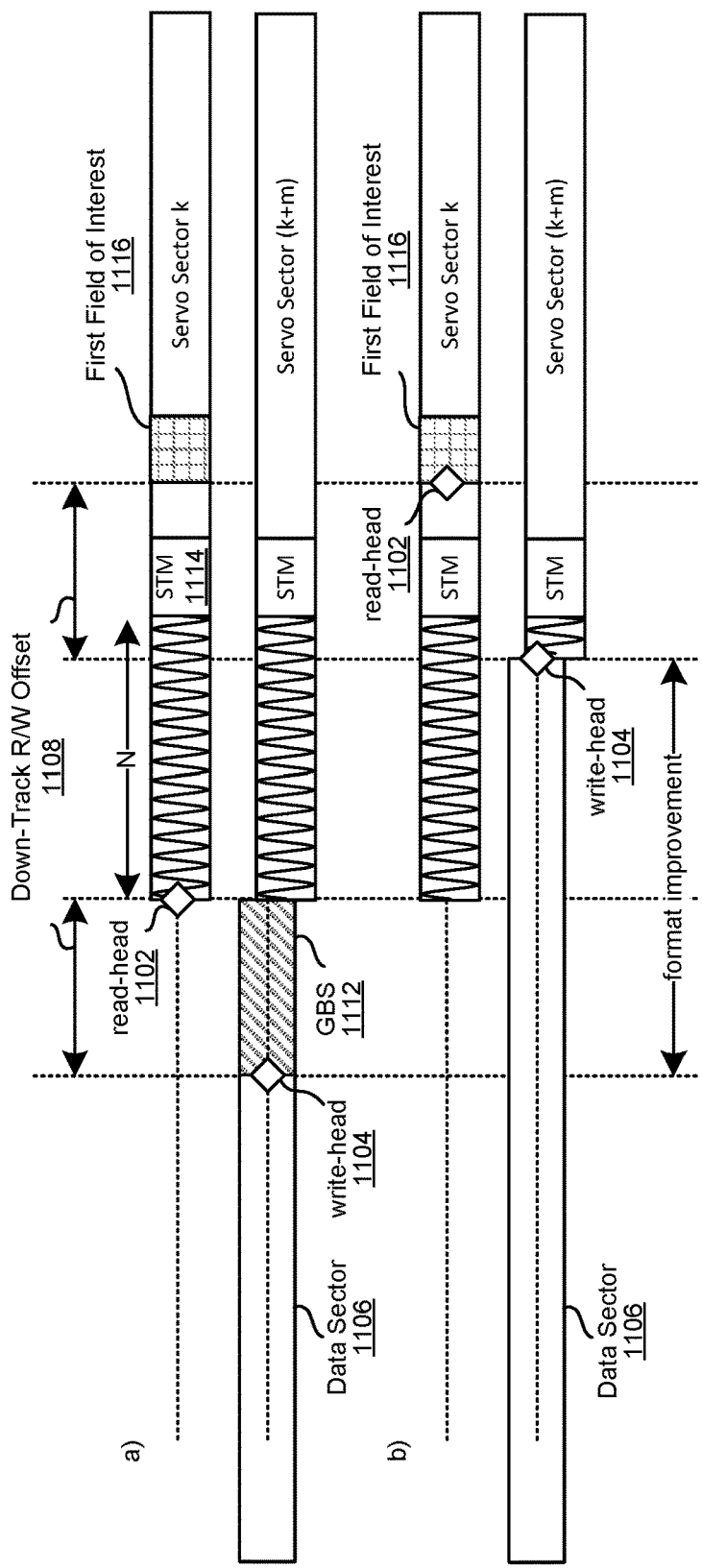
FIG. 11 is a diagram of a system configured to perform disc locked clock-based servo timing, in accordance with certain embodiments of the present disclosure.

FIG. 11 is a diagram of a system configured to perform disc locked clock-based servo timing, in accordance with certain embodiments of the present disclosure. As depicted in FIG. 11, using the DLC counter to artificially declare the detection of STM 1114 allows the write operation to be continued until the read-head 1102 reaches the first field of interest 1116, which may be a first field of the servo sector that requires successful demodulation. Example fields may be a position error signal (PES) field or a gray code field, depending on channel implementation. As shown, this approach allows for disc space equal to the servo sector length up to the first field of interest 1116, including the GBS 1112 and the preamble, to be reclaimed for use in storing user-data and increasing usable drive capacity. Servo sectors for which the preamble has been overwritten may not be available for performing phase-locking operations after seeks or after disc spin-up, but provided sufficient servo sectors having preambles remain the performance of the drive may not be significantly impacted. As a disc may have approximately 500 servo wedges around the circumference, overwriting a half or two thirds of the preamble fields may provide significant storage capacity improvement without significant performance penalties. Example methods of performing DLC-based servo timing are discussed in relation to the following figures.

Figure 12:
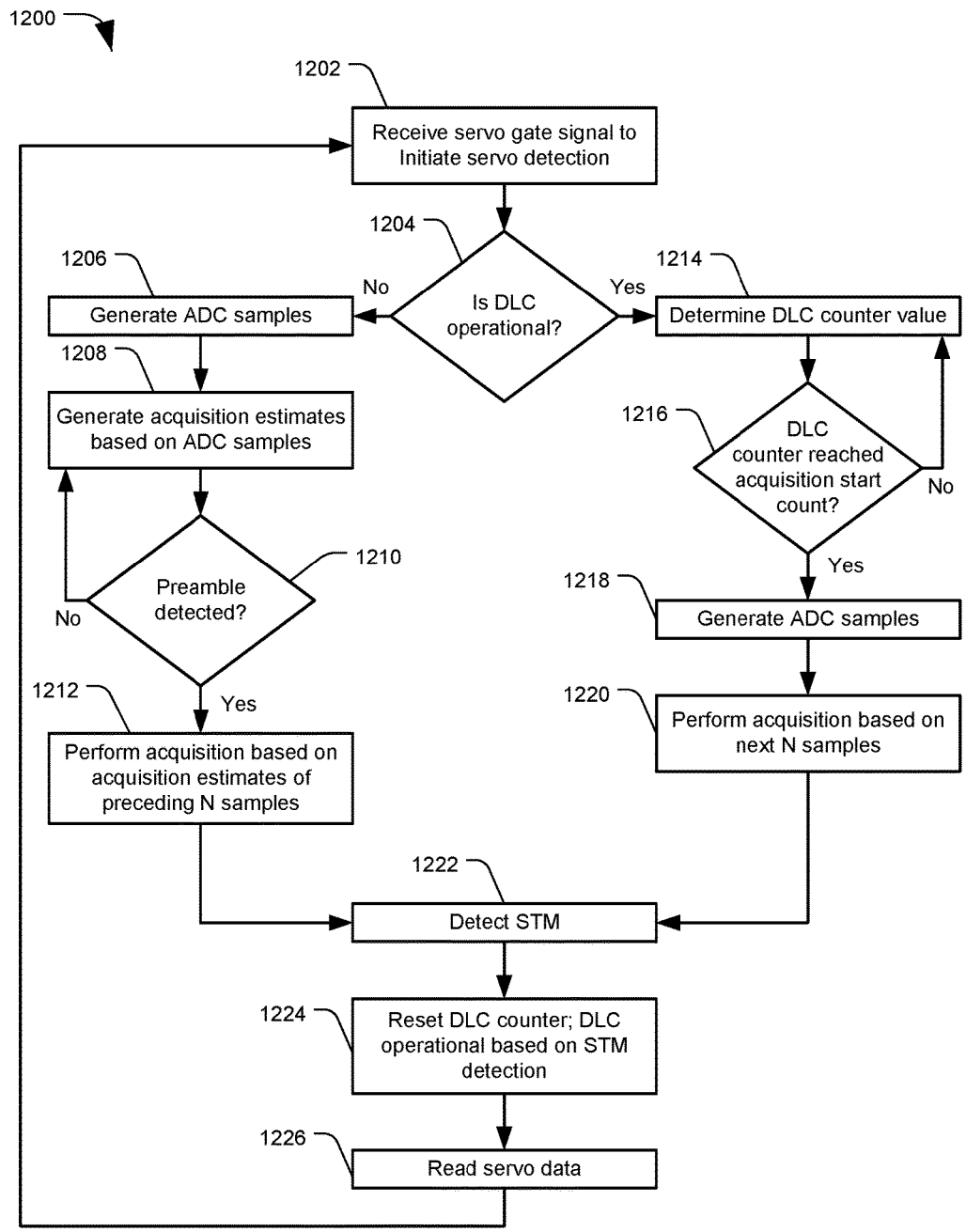
FIG. 12 is a flowchart of an example method of disc locked clock-based servo timing, in accordance with certain embodiments of the present disclosure.

FIG. 12 is a flowchart of an example method of disc locked clock (DLC)-based servo timing, generally designated 1200, in accordance with certain embodiments of the present disclosure. Method 1200 may include a process for acquisition and servo detection performed by one or more components, such as a channel 108 and servo detection module 130 of FIG. 1, of a data storage device (DSD) having shortened servo sector preambles.

The method 1200 may include receiving a servo gate signal at a controller from a formatter, directing the initiating of servo detection operations, at 1202. A determination may then be made whether the DLC of the channel is operational, at 1204. The DLC may be operational when a clock used to control the sampling frequency of the channel is locked to the rotational velocity of a spinning disc storage medium. The DLC may be operational when the heads of the DSD are performing track following or microjog operations, and may be inoperable when a disc is first spun up or during seek operations between spatially distant tracks, as some examples.

If the DLC is not operational, at 1204, the method 1200 may include generating analog-to-digital converter (ADC) samples in response to the assertion of servo gate, at 1206. Generating the ADC samples may include receiving analog signals corresponding to data recorded to a disc via a read head at an ADC, which may then sample the analog signal at a frequency controlled by a clock of the channel to produce digital sample values. The method 1200 may then include generating acquisition estimates based on the ADC samples, at 1208. The acquisition estimates may be estimates of channel settings to apply with the assumption that the ADC samples are from a preamble pattern of a servo sector. The acquisition estimates may be temporarily stored to a memory or registers pending affirmative detection of a preamble pattern.

At 1210, a determination may be made whether preamble has been detected. For example, a preamble detection module may evaluate sliding windows or sets of M consecutive ADC samples to generate a preamble detection metric, and compare the metric against a threshold value. If the metric is below the threshold value, it may indicate that the M samples are from a servo preamble pattern. The N samples may correspond to ADC samples used to generate a current set of acquisition estimates at 1208. If preamble is not detected (e.g. the preamble detection metric is above the threshold), the method 1200 may include shifting the window of samples (e.g. adding 4 new samples and removing the 4 oldest samples from the set of samples) and generating new acquisition estimates, at 1208. If the preamble is detected, the method 1200 may include performing acquisition based on the acquisition estimates of the preceding N samples, at 1212. For example, if preamble was detected based on a selected window of N samples, then the acquisition estimates generated for those same N samples may be used to set parameters of the channel. In some embodiments, different amounts of samples may be used to generate acquisition estimates and perform preamble detection, with the sample windows for each potentially shifting at a different rate.

Returning to 1204, if the DLC is determined to be operational, the method 1200 may include determining a DLC counter value, at 1214. The DLC counter may count up for each clock cycle of the DLC until a resetting trigger is encountered, such as detecting a servo timing mark (STM) of a servo sector. The resetting trigger may be expected to be very close to a target count value of the DLC counter if the DLC is properly locked to the disc rotation. A determination may be made whether the DLC counter has reached an acquisition start count, at 1216. The acquisition start count may be a selected number earlier than the target count, which may correspond to a number "N" of clock cycles used to perform acquisition, plus a number of buffer cycles "B" used to account for potential variation of the DLC frequency to the actual written data frequency on the disc. Accordingly, the acquisition start count may be reached when the DLC counter=(Target Count−(N+B)). If the acquisition start count has not been reached, the method 1200 may include continuing the monitor the DLC counter, at 1214, until the acquisition start count has been reached. When the DLC counter has reached the acquisition start count, the method 1200 may include generating ADC samples, at 1218, as described in regard to 1206. The method 1200 may then include performing acquisition based on the next N ADC samples, at 1220.

Once acquisition has been performed, at either 1212 or 1220, the method 1200 may include detecting the STM, at 1222. The STM 1222 may be a recognized data pattern at the end of the preamble and preceding the data fields of a servo sector, and which may be used to determine that a servo sector has been affirmatively located and set timing for accessing the servo data fields. Upon detection of the STM, the method 1200 may include resetting the DLC counter, at 1224. The DLC counter may then be set as "operational" if the frequency of the channel clock is within an acceptable margin of error from the detected written data frequency. The method may finally include reading the servo data, at 1226, and awaiting a next servo gate signal at 1202. The read servo data may be used for fine head positioning and location identification for use in the reading and writing of user data fields.

Figure 13:
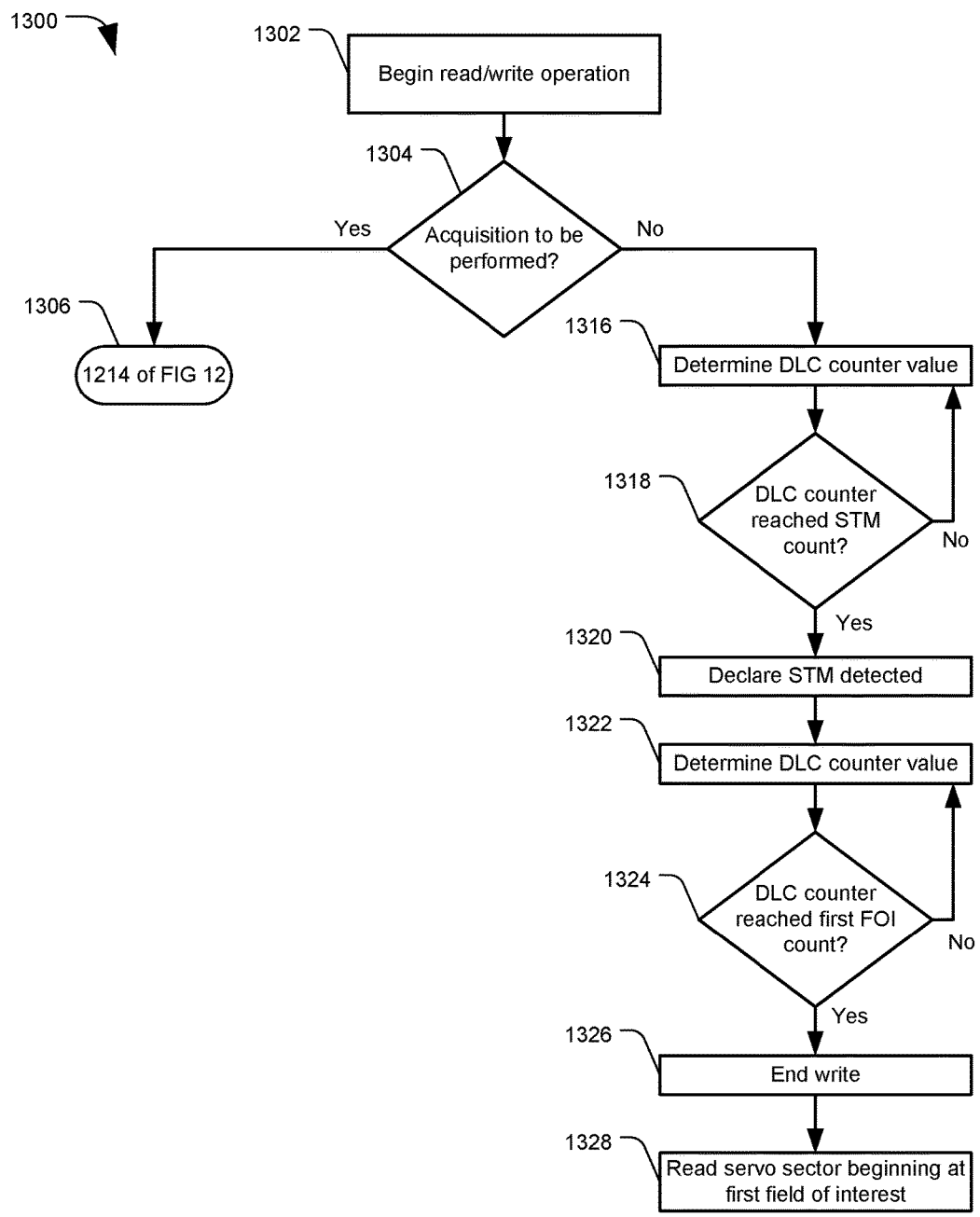
FIG. 13 is a flowchart of an example method of disc locked clock-based servo timing, in accordance with certain embodiments of the present disclosure.

Turning now to FIG. 13, a flowchart of an example method of disc locked clock (DLC)-based servo timing, generally designated 1300, is shown and described in accordance with certain embodiments of the present disclosure. Method 1300 may include a process for performing a write operation followed by servo detection performed by one or more components, such as a channel 108 and servo detection module 130 of FIG. 1, of a data storage device (DSD) having improved format efficiency from the removal of some gap before servo (GBS), servo preamble, and possibly STM fields.

The method 1300 may include beginning a data access operation (e.g. a read or write (R/W) operation), at 1302. The method 1300 may include determining whether acquisition is to be performed, at 1304. For example, the DSD may be configured so that every other servo sector (e.g. every even or odd servo sector) does not include a preamble pattern for performing acquisition, and that channel parameters from a previous acquisition operation are to continue to be used. The channel may determine whether to perform acquisition based on, e.g. a register or flag that gets toggled back and forth with every servo sector, or based on an expected ID (e.g. even or odd) of the next servo sector to be encountered.

If acquisition is to be performed, the method 1300 may include performing acquisition and reading the next servo sector at 1306, as described starting with 1214 of FIG. 12. The data access operation may be ended prior to or concurrent with the DLC counter reaching the acquisition start count.

If acquisition is not to be performed, the method 1200 may include determining the DLC counter value, at 1316. A determination may be made whether the DLC counter has reached a selected STM count, at 1318. For example, the selected STM count may correspond to the target count at which the DLC counter is reset, which may be an expected counter value of where the STM is expected to be located based on a previously located STM and the rotational velocity of the disc. If the STM count has not been reached, the method 1200 may include continuing to monitor the DLC counter value until the STM count is reached. Once reached, the method 1200 may include declaring the STM detected, at 1320, and may optionally include resetting the DLC counter.

Next, the DLC counter may be checked again, at 1322, and a determination made as to whether the DLC counter has reached a first field of interest (FOI) count for the servo sector. The first FOI may be a first data field within the servo sector that the channel intends to read to obtain locational information, and may include a gray code field, a position error signal (PES) field or burst pattern field, or another selected field. The first FOI count for the DLC counter may therefore be a selected number after the STM count, which may correspond to a distance in clock cycles or samples the channel expects the first FOI to be from the STM. The first FOI count may be set to take into account latency or delays in initiating a read after the count is reached, and therefore the first FOI count may be several clock cycles prior to when the read head will reach the actual first FOI. If the DLC counter is not reset after the STM count, then the FOI count may be higher than the STM count. If the DLC counter is reset after the STM count, then the FOI count may be a lower counter value than the STM count. If the DLC counter has not yet reached the first FOI count, at 1324, the method 1300 may include continuing to monitor the DLC counter until the FOI count is reached. Once the FOI count is reached, the method 1300 may include ending the write operation, at 1326, and reading the servo sector beginning at the first FOI, at 1328.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, although the nonvolatile memory in the example embodiments is often referred to as "flash" memory, other types of nonvolatile memories may be substituted besides flash memory. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a servo channel configured to:
      lock a frequency of a servo channel clock to a rotational velocity of a disc data storage medium;
      maintain a counter of clock cycles for the servo channel clock; and
      perform operations to read servo data from a servo sector on the disc data storage medium at a first counter value selected relative to a target counter value corresponding to an expected location of a servo timing mark (STM).

2. The apparatus of claim 1 comprising the servo channel further configured to:
   perform the operations to read servo preamble data at the first counter value, the first counter value set to occur a selected number of clock cycles prior to the expected location of the STM.

3. The apparatus of claim 2 comprising the servo channel further configured to:
   perform an acquisition operation to set parameters of the servo channel based on the servo preamble data.

4. The apparatus of claim 3, further comprising:
   the selected number of clock cycles is based on a number of preamble data samples used to perform the acquisition operation plus a selected number of buffer samples.

5. The apparatus of claim 4, further comprising:
   the selected number of buffer samples is selected based on an expected error margin between a clock rate of the servo channel and a rotational velocity of the disc data storage medium.

6. The apparatus of claim 2, further comprising:
   the disc data storage medium, wherein the disc data storage medium is formatted to have servo sector preambles of a length corresponding to the selected number of clock cycles.

7. The apparatus of claim 2 comprising the servo channel further configured to:
   receive a servo gate signal from a hard disc controller circuit; and
   perform the operations to read the servo preamble data after receiving the servo gate signal only when the counter has reached the first counter value.

8. The apparatus of claim 2 comprising the servo channel further configured to:
   determine whether the servo channel clock is locked to the rotational velocity of the disc data storage medium;
   when the servo channel clock is locked to the rotational velocity of the disc data storage medium, perform the operations to read the servo preamble data at the first counter value;
   when the servo channel clock is not locked to the rotational velocity of the disc data storage medium:
      generate acquisition estimates based on a sliding window of signal sample values from an analog to digital converter (ADC);
      determine whether the sliding window of signal sample values corresponds to the servo preamble pattern;
      use the acquisition estimates to set parameters of the servo channel when the sliding window of signal sample values does correspond to the servo preamble pattern; and
      slide the sliding window by adding a selected number of new sample values and discarding the selected number of old sample values when the sliding window of signal sample values does not correspond to the servo preamble pattern.

9. The apparatus of claim 1 comprising the servo channel further configured to:
   perform the operations to read a first field of interest of the servo sector at the first counter value, the first counter value set to occur a selected number of clock cycles after the expected location of the STM, the first field of interest corresponding to a selected data field within the servo sector that includes locational information.

10. The apparatus of claim 9 comprising the servo channel further configured to:
    during a data access operation to a user data field, determine whether to perform an acquisition operation for the servo sector;
    when the acquisition operation is not to be performed:
       declare the STM detected when the counter reaches the target counter value; and
       perform the operations to read the first field of interest when the counter reaches the first counter value.

11. The apparatus of claim 10 comprising the servo channel further configured to:
    when the acquisition operation is to be performed:
       receive a servo gate signal from a hard disc controller circuit;
       perform second operations to read servo preamble data at a second counter value, the second counter value set to occur a second selected number of clock cycles prior to the expected location of the STM; and
       perform the acquisition operation to set parameters of the servo channel based on the servo preamble data.

12. The apparatus of claim 10 further comprising:
    a data channel configured to:
       perform the data access operation; and
       continue the data access operation until the operations to read the first field of interest.

13. The apparatus of claim 10 further comprising:
    the servo channel further configured to perform acquisition operations on selected servo sectors;
    the disc data storage medium configured to:
       include preamble patterns with the selected servo sectors;

include a gap between the preamble patterns and a data sector preceding the selected servo sectors;
do not include the gap before non-selected servo sectors; and
do not include a full preamble pattern with the non-selected servo sectors.

14. A method comprising:
locking, at a servo channel, a frequency of a servo channel clock to a rotational velocity of a disc data storage medium;
maintaining a counter at the servo channel of clock cycles for the servo channel clock; and
performing, at the servo channel, operations to read servo data from a servo sector on the disc data storage medium at a first counter value selected relative to a target counter value corresponding to an expected location of a servo timing mark (STM).

15. The method of claim 14 further comprising:
performing the operations to read servo preamble data at the first counter value, the first counter value set to occur a selected number of clock cycles prior to the expected location of the STM.

16. The method of claim 15 further comprising:
performing an acquisition operation to set parameters of the servo channel based on the servo preamble data, the selected number of clock cycles is based on a number of preamble data samples used to perform the acquisition operation plus a selected number of buffer samples, the selected number of buffer samples is selected based on an expected error margin between a clock rate of the servo channel and a rotational velocity of the disc data storage medium.

17. The method of claim 15 further comprising:
formatting the disc data storage medium to have servo sector preambles of a length corresponding to the selected number of clock cycles.

18. The method of claim 15 further comprising:
receiving, at the servo channel, a servo gate signal from a hard disc controller circuit; and
performing the operations to read the servo preamble data after receiving the servo gate signal only when the counter has reached the first counter value.

19. The method of claim 15 further comprising:
determining whether the servo channel clock is locked to the rotational velocity of the disc data storage medium;
when the servo channel clock is locked to the rotational velocity of the disc data storage medium, performing the operations to read the servo preamble data at the first counter value;
when the servo channel clock is not locked to the rotational velocity of the disc data storage medium:
generating acquisition estimates based on a sliding window of signal sample values from an analog to digital converter (ADC);
determining whether the sliding window of signal sample values corresponds to the servo preamble pattern;
applying the acquisition estimates to set parameters of the servo channel when the sliding window of signal sample values does correspond to the servo preamble pattern; and
sliding the sliding window by adding a selected number of new sample values and discarding the selected number of old sample values when the sliding window of signal sample values does not correspond to the servo preamble pattern.

20. The method of claim 14 further comprising:
performing the operations to read a first field of interest of the servo sector at the first counter value, the first counter value set to occur a selected number of clock cycles after the expected location of the STM, the first field of interest corresponding to a selected data field within the servo sector that includes locational information.

21. The method of claim 20 further comprising:
performing a data access operation to a user data field via a write channel;
during the data access operation, determining, via the servo channel, whether to perform an acquisition operation for the servo sector;
when the acquisition operation is not to be performed:
declaring the STM detected via the servo channel when the counter reaches the target counter value;
performing the operations to read the first field of interest when the counter reaches the first counter value;
continuing the data access operation until the operations to read the first field of interest;
when the acquisition operation is to be performed:
receiving a servo gate signal from a hard disc controller circuit;
ending the data access operation;
performing second operations, via the servo channel, to read servo preamble data at a second counter value, the second counter value set to occur a second selected number of clock cycles prior to the expected location of the STM; and
performing the acquisition operation to set parameters of the servo channel based on the servo preamble data.

22. The method of claim 21 further comprising:
performing acquisition operations on selected servo sectors;
formatting the disc data storage medium to include preamble patterns with the selected servo sectors;
formatting the disc data storage medium to include a gap between the preamble patterns and a data sector preceding the selected servo sectors;
formatting the disc data storage medium to not include the gap before non-selected servo sectors; and
formatting the disc data storage medium to not include a full preamble pattern with the non-selected servo sectors.

23. An apparatus comprising:
a data storage device including:
a disc data storage medium;
a channel circuit configured to:
lock a frequency of a channel clock to a rotational velocity of the disc data storage medium;
maintain a counter of clock cycles for the channel clock; and
perform operations to read servo data from a servo sector on the disc data storage medium at a first counter value selected relative to a target counter value corresponding to an expected location of a servo timing mark (STM).

24. The apparatus of claim 23 comprising the channel circuit further configured to:
perform the operations to read servo preamble data at the first counter value, the first counter value set to occur a selected number of clock cycles prior to the expected location of the STM.

25. The apparatus of claim 24 comprising the channel circuit further configured to:

perform an acquisition operation to set parameters of the channel circuit based on the servo preamble data;

wherein the selected number of clock cycles is based on a number of preamble data samples used to perform the acquisition operation plus a selected number of buffer samples; and wherein the selected number of buffer samples is selected based on an expected error margin between a clock rate of the channel circuit and a rotational velocity of the disc data storage medium.

26. The apparatus of claim 24 further comprising the disc data storage medium is formatted to have servo sector preambles of a length corresponding to the selected number of clock cycles.

27. The apparatus of claim 24 comprising the channel circuit further configured to:

receive a servo gate signal from a hard disc controller circuit; and perform the operations to read the servo preamble data after receiving the servo gate signal only when the counter has reached the first counter value.

28. The apparatus of claim 24 comprising the channel circuit further configured to:

determine whether the channel clock is locked to the rotational velocity of the disc data storage medium;

when the channel clock is locked to the rotational velocity of the disc data storage medium, perform the operations to read the servo preamble data at the first counter value;

when the channel clock is not locked to the rotational velocity of the disc data storage medium:

generate acquisition estimates based on a sliding window of signal sample values from an analog to digital converter (ADC);

determine whether the sliding window of signal sample values corresponds to the servo preamble pattern;

apply the acquisition estimates to set parameters of the servo channel when the sliding window of signal sample values does correspond to the servo preamble pattern; and adjust signal samples included in the sliding window by adding a selected number of new sample values and discarding the selected number of old sample values when the sliding window of signal sample values does not correspond to the servo preamble pattern.

29. The apparatus of claim 23 comprising the channel circuit further configured to:

perform the operations to read a first field of interest of the servo sector at the first counter value, the first counter value set to occur a selected number of clock cycles after the expected location of the STM, the first field of interest corresponding to a selected data field within the servo sector that includes locational information.

30. The apparatus of claim 29 comprising the channel circuit further configured to:

perform a data access operation to a user data field;

during the data access operation, determine whether to perform an acquisition operation for the servo sector;

when the acquisition operation is not to be performed:

declare the STM detected based on the counter reaching the target counter value;

perform the operations to read the first field of interest when the counter reaches the first counter value; and continue the write operation until the operations to read the first field of interest.

* * * * *